US009842563B2

(12) United States Patent
Russell

(10) Patent No.: US 9,842,563 B2
(45) Date of Patent: Dec. 12, 2017

(54) PROGRAMMABLE, INTERACTIVE DISPLAY RECEPTACLE WITH USE MONITORING AND INDEPENDENT ACTIVATION, DEACTIVATION, AND CHANGE CAPABILITIES

(71) Applicant: James M. Russell, West Barnstable, MA (US)

(72) Inventor: James M. Russell, West Barnstable, MA (US)

( * ) Notice: Subject to any disclaimer, the term of this patent is extended or adjusted under 35 U.S.C. 154(b) by 0 days.

(21) Appl. No.: 15/285,713

(22) Filed: Oct. 5, 2016

(65) Prior Publication Data

US 2017/0025085 A1    Jan. 26, 2017

Related U.S. Application Data

(63) Continuation of application No. 14/508,154, filed on Oct. 7, 2014, now abandoned.
(60) Provisional application No. 61/887,712, filed on Oct. 7, 2013.

(51) Int. Cl.

| G09G 5/00 | (2006.01) |
| G06F 1/16 | (2006.01) |
| G06F 3/14 | (2006.01) |
| G06F 3/03 | (2006.01) |
| A47G 19/22 | (2006.01) |
| G06F 3/147 | (2006.01) |
| G06F 3/0346 | (2013.01) |
| G06F 3/041 | (2006.01) |

(52) U.S. Cl.
CPC ......... *G09G 5/003* (2013.01); *A47G 19/2227* (2013.01); *G06F 1/1652* (2013.01); *G06F 3/0346* (2013.01); *G06F 3/0412* (2013.01); *G06F 3/147* (2013.01); *A47G 2019/225* (2013.01); *A47G 2019/2244* (2013.01); *G09G 2354/00* (2013.01); *G09G 2380/02* (2013.01)

(58) Field of Classification Search
CPC ..... G09G 5/003; G06F 1/1652; G06F 3/0346; G06F 3/0412; G06F 3/147
See application file for complete search history.

(56) References Cited

U.S. PATENT DOCUMENTS

| 2010/0182518 A1* | 7/2010 | Kirmse | G06F 1/1626 348/836 |
| 2012/0102431 A1* | 4/2012 | Krolczyk | G06F 17/30044 715/790 |
| 2014/0059581 A1* | 2/2014 | Wang | B67C 3/007 725/24 |

* cited by examiner

*Primary Examiner* — Ariel Balaoing
(74) *Attorney, Agent, or Firm* — BainwoodHuang

(57) ABSTRACT

A receptacle having a programmable, interactive visual display affixed to a surface of the receptacle. The receptacle includes the visual display, a programmable memory, and a controller. The memory stores data corresponding to one or more display images and/or text, and the controller controls the display for displaying the image/text data from the memory. The receptacle may further include an input mechanism for receiving at least one input, and the controller may control the display of images/text data in response to the input. The memory can also store at least one game or other program, and the controller can execute the game or other program from the memory, operate the game or other in response to one or more inputs received via the input mechanism, and control the display based on the requirements of the game or other programs. The display may include an audio component for producing audible sound.

17 Claims, 16 Drawing Sheets

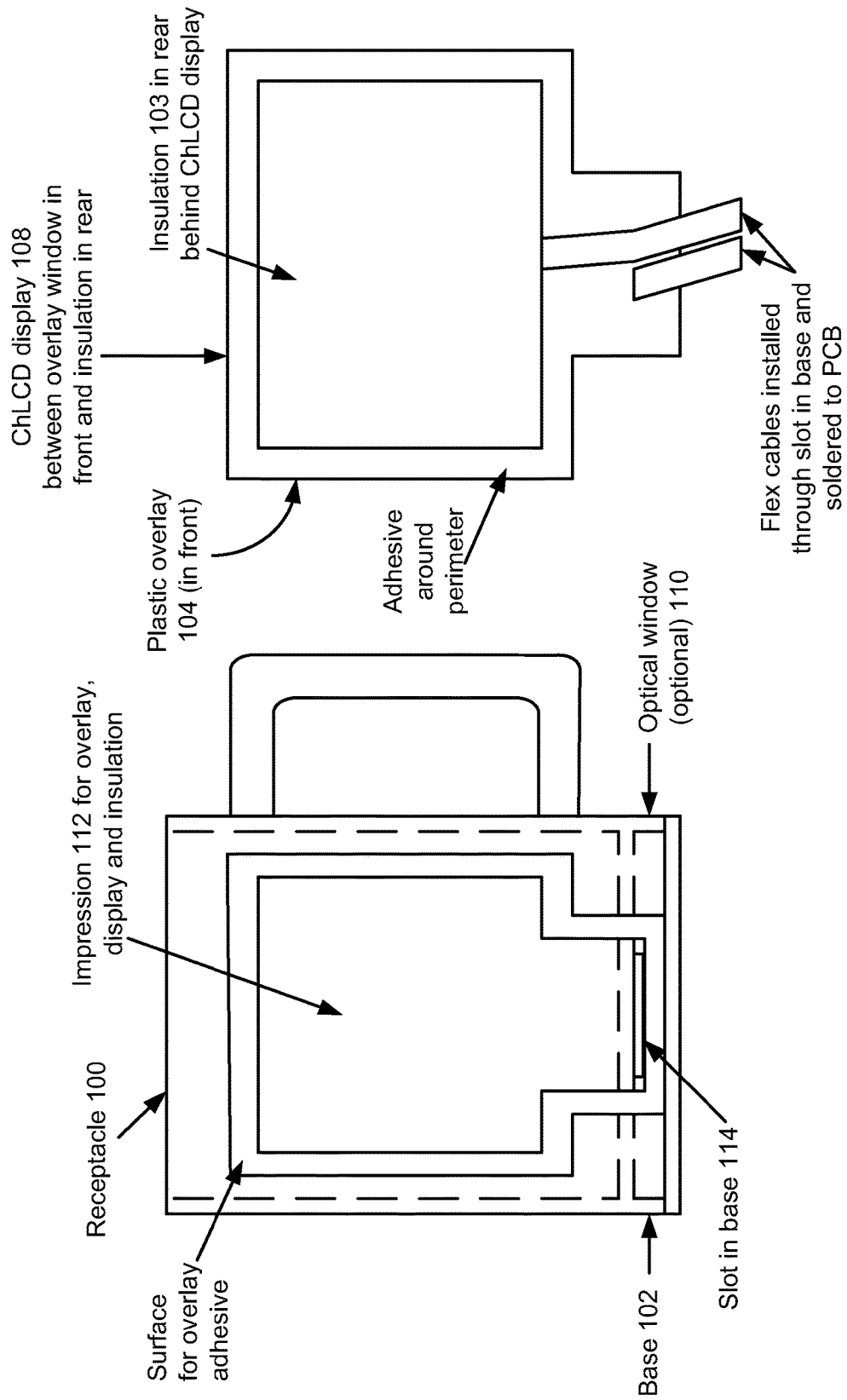

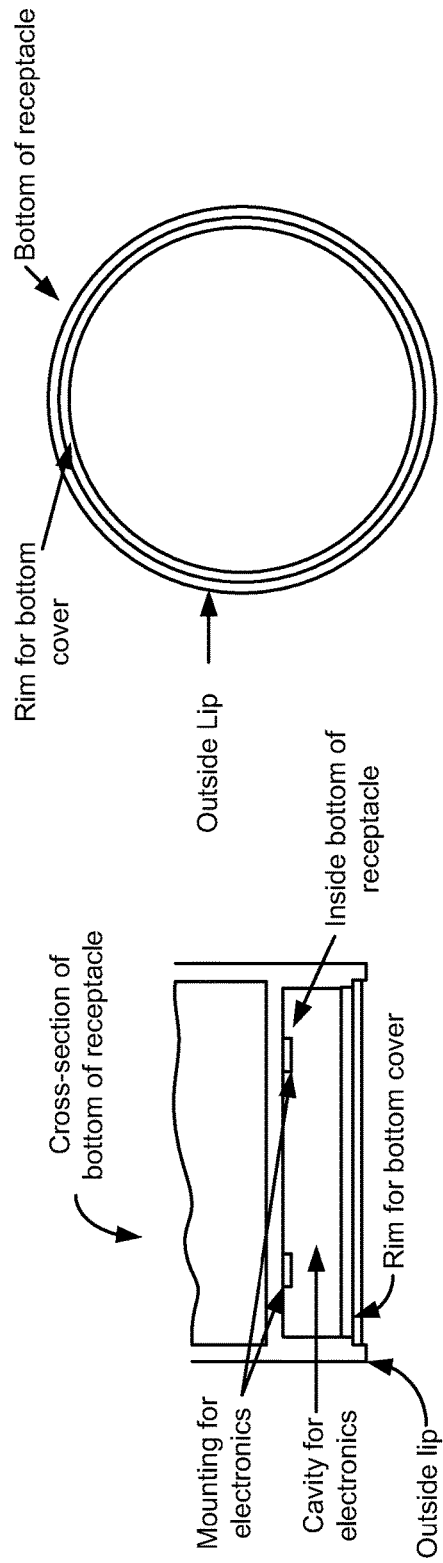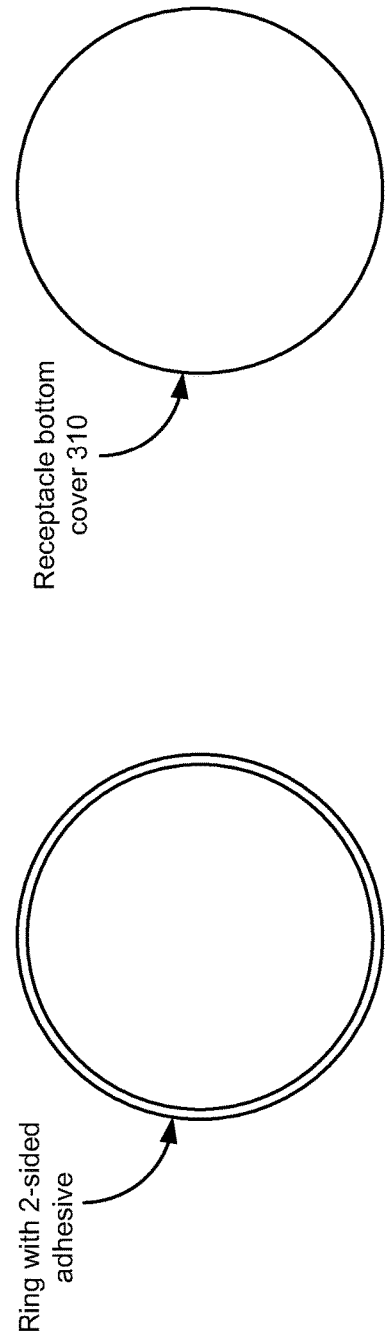

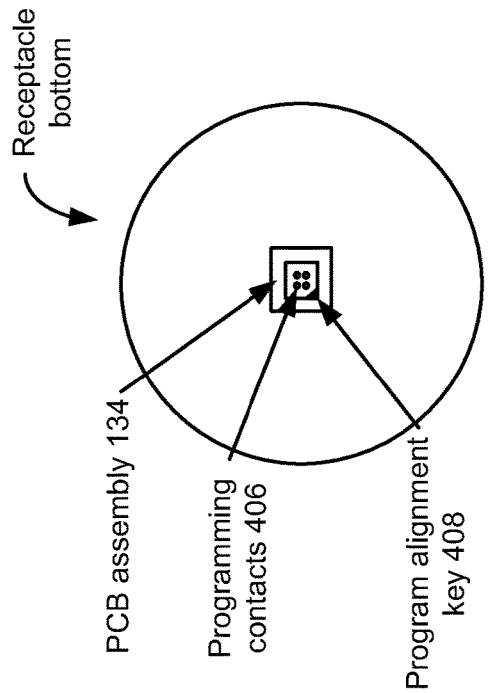
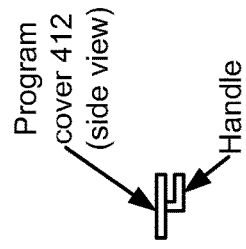
*Fig. 4b*
*Fig. 4e*
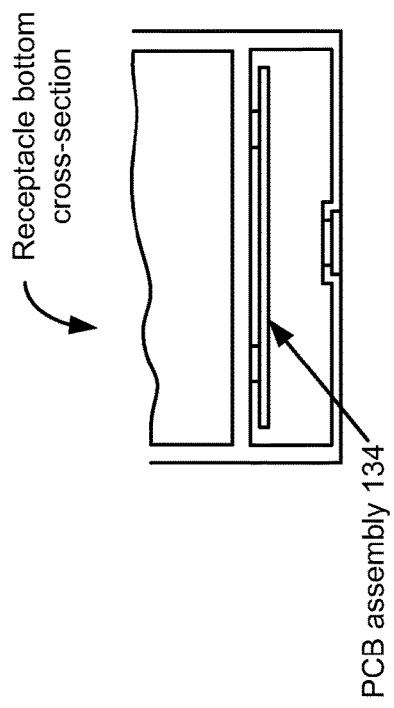
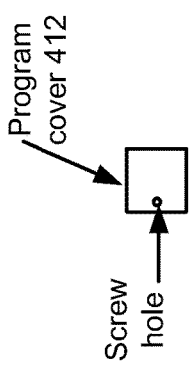
*Fig. 4d*
*Fig. 4a*
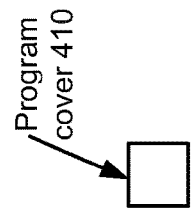
*Fig. 4c*

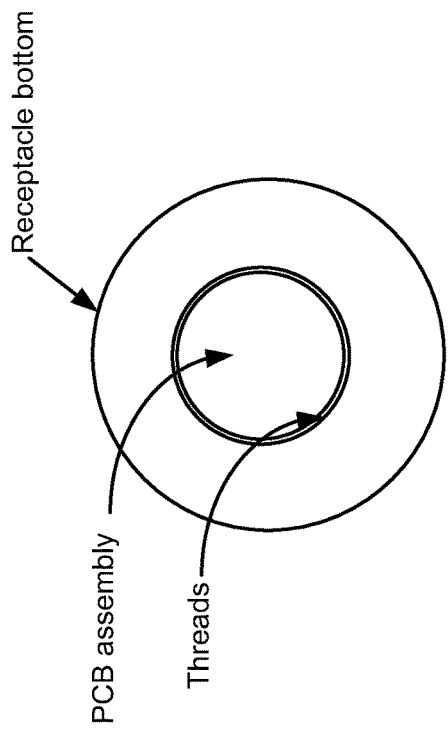
Fig. 5b
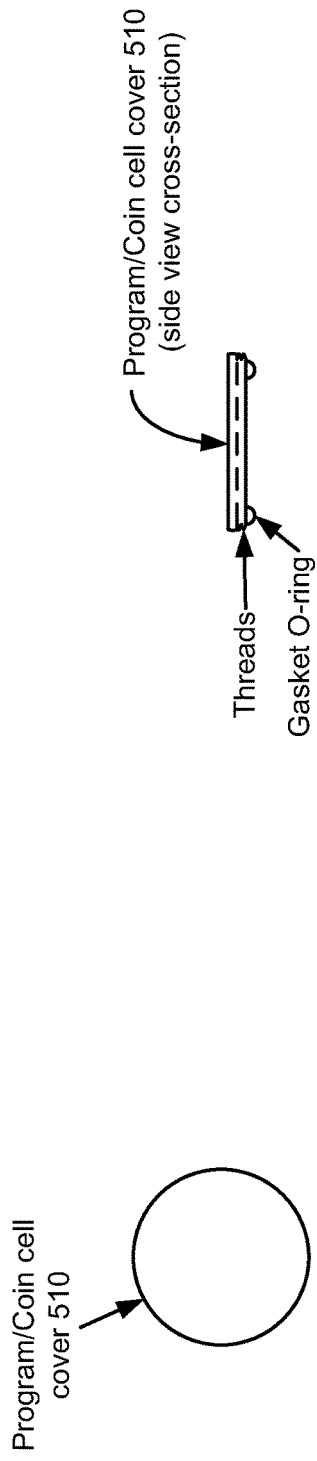
Fig. 5d
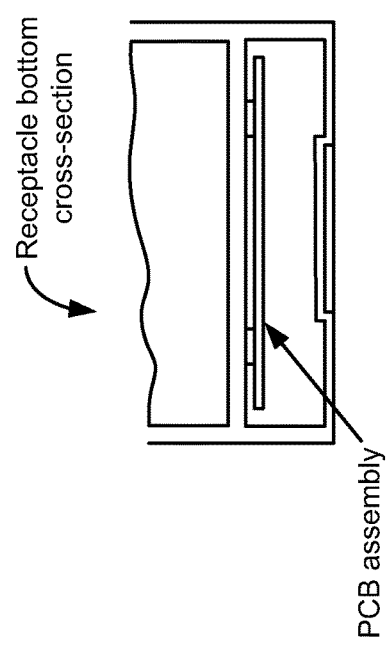
Fig. 5a
Fig. 5c

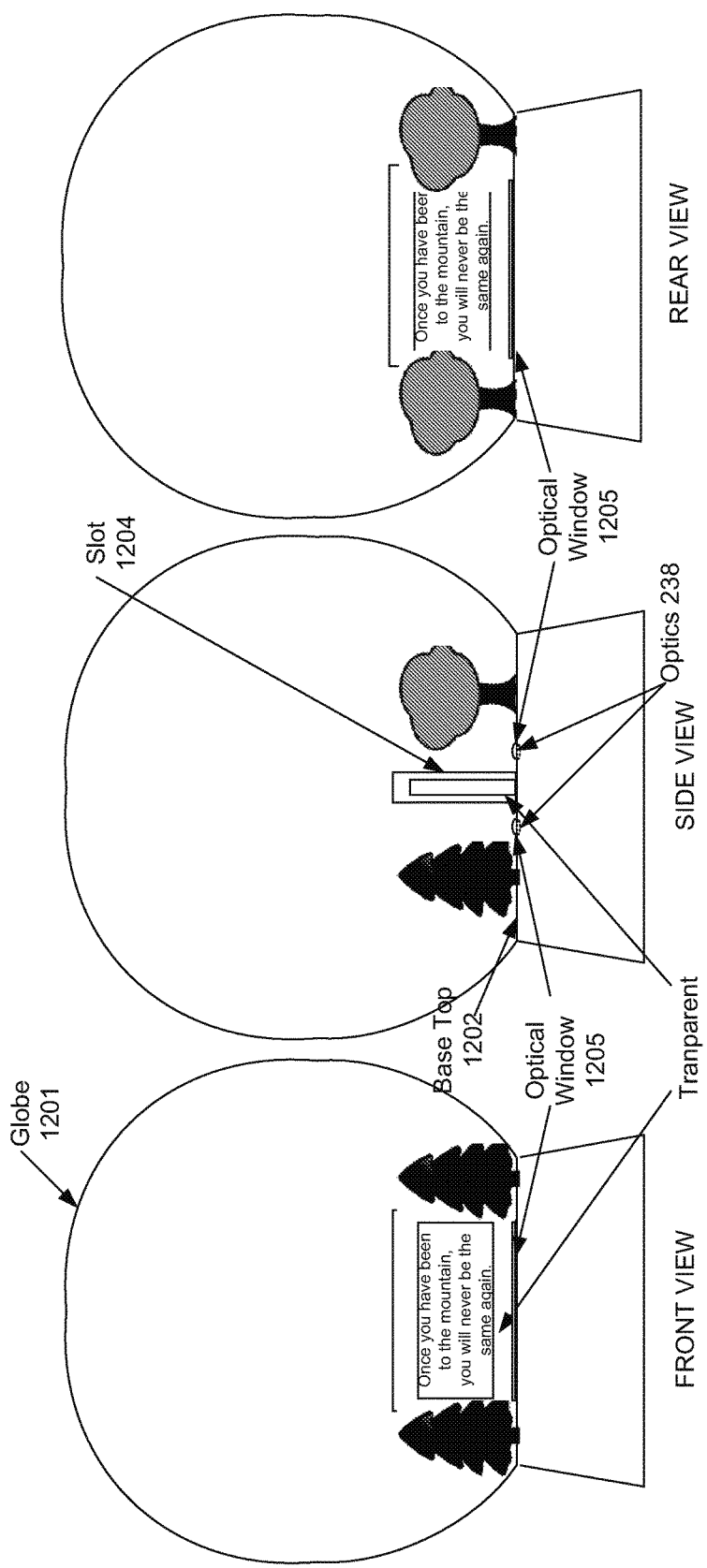

PROGRAMMABLE, INTERACTIVE DISPLAY RECEPTACLE WITH USE MONITORING AND INDEPENDENT ACTIVATION, DEACTIVATION, AND CHANGE CAPABILITIES

CROSS REFERENCE TO RELATED APPLICATIONS

This application is a continuation of U.S. patent application Ser. No. 14/508,154 filed Oct. 7, 2014 entitled PROGRAMMABLE, INTERACTIVE DISPLAY RECEPTACLE WITH USE MONITORING AND INDEPENDENT ACTIVATION, DEACTIVATION, AND CHANGE CAPABILITIES, and claims benefit of the priority of U.S. Provisional Patent Application No. 61/887,712 filed Oct. 7, 2013 entitled PROGRAMMABLE, INTERACTIVE DISPLAY RECEPTACLE WITH USE MONITORING AND INDEPENDENT ACTIVATION, DEACTIVATION, AND CHANGE CAPABILITIES.

TECHNICAL FIELD

The present application relates generally to receptacles with displays, and more specifically to receptacles for consumable or non-consumable material with programmable, interactive displays that can be monitored, activated, deactivated, changed, and/or kept fixed during use.

BACKGROUND

Novelty and gift cups and mugs are known that can be adorned with designs that include text and/or images, which are typically fixed for the life of the respective cup or mug. U.S. Pat. No. 5,339,548 to Russell discloses a liquid receptacle such as a cup or mug with a display that can continually change to provide new or different images and/or messages. The display is activated by changes in the level of liquid in the cup or mug. However, there is no means of monitoring the use of the receptacle, the angle and/or orientation of the receptacle, the velocity and/or direction of movement of the receptacle, the temperature of the receptacle, etc. Further, there is no independent means of controlling when the display on the receptacle is activated. For example, activation of the display cannot be disabled, and the display time cannot be modified. Moreover, there is no independent means of deactivating the display or keeping it fixed (unchanged). In addition, user interaction is limited to causing changes in the level of the liquid in the cup or mug. There is no independent means of interacting with the receptacle, which is configured with a processor for running a software program that is fixed for the life of the receptacle and is designed to be mass produced. The display is also susceptible to damage due to increased temperature of the liquid in the receptacle or the receptacle itself.

SUMMARY

In accordance with the present application, a receptacle for consumable or non-consumable material is disclosed that has a changeable, electronic display affixed to a surface of the receptacle. The display can be activated, deactivated, changed, and/or kept fixed by a user. The display can also be configured to activate, deactivate, change, and/or be kept fixed under the control of the receptacle hardware, software, and/or sensor(s). The user can control the display for displaying selected animated and/or still visual images and/or text. The receptacle is configured to allow the user to interact with information communicated via the display, and to allow the execution of selected software programs for operating one or more games and/or other programs in conjunction with the display. The display can be programmed and/or re-programmed by the user, a manufacturer, a distributor, and/or a re-seller of the receptacle. The receptacle has mechanical, hardware, software, and sensor features that are designed to prevent damage to the display, and to avoid unintentional injury to the user. The receptacle is also designed to monitor and respond to receptacle use.

In one aspect, an exemplary receptacle includes a visual display, a programmable memory, a power source (such as a battery), and a controller. The visual display is affixed to a surface of the receptacle, and is configured to conform to the shape of the receptacle surface. The controller and software program include a real time clock function (for keeping track of date and time, receptacle use, timing of events, etc.). The programmable memory is configured to store data corresponding to one or more display images and/or text, along with the sequence, order, timing, and/or associations in which the images and/or text are presented. The programmable memory can be configured to store data corresponding to the time and date to activate, deactivate, and/or change the display. The programmable memory can also be used to store information pertaining to receptacle use. The receptacle can be molded, embossed, or printed with a fixed image or form corresponding to or representative of the same user, group, organization, theme, or subject that the display images were programmed for in the programmable memory.

The controller is operative to control the visual display for activating, deactivating, changing, and/or keeping fixed the image and/or text data accessed from the memory. In an exemplary aspect, the receptacle may further include an input mechanism including one or more switches, sensors, and/or transducers for receiving at least one input, and the controller can be configured to control the display of images and/or text in response to the input. Controller input can also be provided by a thermistor, which can be used by the controller to monitor the temperature of the area of the display so that the controller can compensate the display over the operational temperature range, and protect the display from over-temperature operation, for example, by deactivating, not activating, and/or not changing the display during over-temperature conditions. In addition, the memory can be configured to store at least one game or other program, and the controller can be configured to execute the program from the memory to operate the program in response to one or more inputs received by the input mechanism, and to control the display according to the requirements of the program. The display is further designed such that accidental use in a microwave oven will avoid potential harm to the user.

In another aspect, the receptacle further includes an audio component operative to produce audible sound. In an exemplary aspect, the programmable memory is further configured to store data corresponding to one or more sounds, and the controller is further operative to control the audio component for producing sound corresponding to the data stored in the memory. Such sound produced by the audio component may be synchronized with, or otherwise correspond to, the images and/or text displayed on the visual display. In addition, the controller may be configured to execute a game or other program from the memory, to operate the program in response to one or more inputs received by the input mechanism, and to control one or both of the visual display and the audio component according to the requirements of the program.

Each aspect of the receptacle includes the visual display, which is a changeable, flexible display sealably affixed to an inside or outside surface, or between the inner and outer surface, of the receptacle. The display is configured to conform to the surface of the receptacle. Further, the audio component may be incorporated into the display assembly, or may be disposed in any suitable location separate from the display. The receptacle is configured to allow the user to activate, deactivate, change, and/or keep fixed the display of visible images/text on the flexible display, to initiate, change, and/or shut off the production of audible sound from the audio component, and/or to initiate, change, and/or terminate the execution of game or other programs from the memory at anytime via the input mechanism, which may comprise one or more switches, sensors, and/or transducers. The display of images/text, the production of sound, and/or the execution of programs may also be initiated, changed, and/or deactivated in response to one or more predetermined conditions. The receptacle can be configured to allow the controller, the real time clock function, and/or the software to activate, deactivate, and/or change the display. The programmable memory and controller included in the receptacle can be programmed to satisfy the requirements of any suitable market segment, group, and/or individual, and can be programmed/re-programmed throughout the lifetime of the receptacle via a hard-wired or wireless serial port.

As described above, the presently disclosed receptacle comprises the display, which may include both visual and audio components. The display can be activated, deactivated, changed, and/or kept fixed by the user via the input mechanism (e.g., one or more switches, sensors, and/or transducers) at anytime, and can provide changing audio and/or video display content based on software programming. Once the display is activated, the user can interact with the display via the input mechanism to change the audio and/or video display content, for example, based on one or more user responses provided via the switches. The audio and/or video display content can also be changed in response to signals provided by the sensors or transducers associated with the receptacle.

In addition, the receptacle can provide different display activation, deactivation, and change requirements as well as changing audio and/or video display content after being programmed by the user, a manufacturer, a distributor, and/or a re-seller of the receptacle. For example, the program memory or logic can be programmed and/or re-programmed at the user's location, the manufacturer's location, or the re-seller's location. The program memory or logic may be programmed/re-programmed via direct contact with programming signals in the receptacle electronics, or via a wireless programming technique. For example, the program memory or logic may be programmed/re-programmed via direct contact with programming signals in the receptacle electronics, or by using a communications port included in the controller or microprocessor. Further, the program memory or logic may be programmed/re-programmed using a programming fixture designed to program multiple receptacles, and to make contact with the electronics within the multiple receptacles for programming each receptacle. After being programmed, the electronics associated with each receptacle may be sealed from the environment with a suitable cover or seal.

Moreover, the display can be incorporated with a plastic or glass overlay, which may be disposed on an outside or inside surface of the receptacle or within the receptacle base. Other receptacle electronics may also be incorporated within the plastic overlay or receptacle base. For example, such electronics may be incorporated with both the plastic overlay disposed on the outside/inside surface of the receptacle and the base of the receptacle. In this configuration, a flex cable or any other suitable type of cable may be employed to connect the electronics contained with the plastic overlay to the electronics contained within the receptacle base. The receptacle can be molded, embossed or printed with a fixed image or form corresponding to or representative of the same user, group, organization, theme, or subject as the display images. The display and/or the receptacle electronics may be housed or otherwise disposed within the receptacle cover, on a carrier designed to hold the receptacle, or in a removable receptacle insulator.

Benefits of the presently disclosed receptacle for consumable or non-consumable material are achieved via (1) the display that can be disposed on an outside or inside surface, between two surfaces, or on or between any other suitable surface(s) of the receptacle, the receptacle cover, the receptacle carrier, the receptacle insulator, or within the receptacle base, (2) the mechanism(s) for activating or deactivating the receptacle electronics, providing user inputs to receptacle operations/programs, sensing receptacle use, and activating, deactivating, changing, or keeping fixed the display, either directly or indirectly by the user or a third party, (3) the controller that may include a real time clock function responsive to both the input mechanism(s) and the software, (4) the ability to engage and entertain the user by allowing him or her to initiate and interact with the changing images and/or text on the display as well as the changing sounds produced by the audio component, including manually activating and/or deactivating the display/audio components at anytime and interacting with the display/audio components once they become activated, and (5) the programmability of the receptacle electronics via a hard-wired or wireless port that allows the customization needs of substantially all market segments, applications, and users to be fulfilled.

The presently disclosed programmable, interactive display receptacle with use-monitoring and independent activation, deactivation, and change includes a receptacle for holding a consumable material (e.g., a food or beverage) or a non-consumable material, the battery for providing power to the electronics, the programmable and/or re-programmable memory and microprocessor for storing data and software programs and controlling and operating the receptacle electronics for subsequent display of visible images/text and production of audible sound, the display and audio components affixed to an outside or inside surface or between the surfaces of the receptacle, a receptacle cover, a receptacle carrier, a receptacle insulator, or disposed within the receptacle base, one or more sensors for monitoring receptacle use, and an interactive user interface mounted in or on the receptacle, the receptacle cover, the receptacle insulator, the receptacle base, or the receptacle carrier. The interactive interface may comprise an input mechanism including one or more switches, sensors, and/or transducers, which the user can employ to activate, control, change, keep fixed, deactivate, and/or interact with the content of the visual display and/or the audible sound.

In a further aspect, the receptacle may be a vessel such as a cup, a mug, or a glass for containing a liquid or solid consumable material, including, but not limited to, coffee, soda, juice, water, popcorn, peanuts, etc. Alternatively, the receptacle may be a container for a liquid or solid non-consumable material. Further, the display may be an electronic display that may include both visual and audio components. Moreover, the display may be a conformable, flat panel display sealably affixed to an outside or inside surface of the receptacle, for example, on the outside surface of the receptacle, a carrier, or an insulator of the receptacle. The controller may include a real time clock function and be designed to work with software to keep track of the time and date, as well as the time between uses of the receptacle. The software program may include the times and dates for display activation, deactivation, and/or change. The user interface or input mechanism may be a switch, acoustic sensors including a microphone, RF (radio frequency) and other communications including NFC (Near Field Communications) and Bluetooth, an accelerometer, and/or other sensor or transducer that can be activated by the user's direct or indirect input. The user interface may be a resistive, capacitive, membrane, or pressure sensitive switch or touch screen, or any other suitable user interface. In addition, the sensor or transducer may be configured to monitor receptacle use, and may be a sound, temperature, vibration, motion, angle, level (such as an accelerometer), and/or optical sensor or transducer, or any other suitable sensor or transducer.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 1a is a side view of an exemplary receptacle according to the present application;

FIG. 1b is an overlay including a bistable ChLCD flexible display for use with the receptacle of FIG. 1a;

FIG. 1d is an illustration of a manner of affixing an alternative embodiment of the overlay of FIG. 1b to the surface of the receptacle of FIG. 1a;

FIG. 2 is a schematic diagram depicting electronic circuitry in the receptacle of FIG. 1a;

FIGS. 3a-3b depict views of the bottom of the receptacle of FIG. 1a;

FIG. 3c depicts a 2-sided adhesive ring for use on the receptacle bottom of FIGS. 3a-3b;

FIG. 3d depicts a cover for the receptacle bottom of FIGS. 3a-3b;

FIGS. 4a-4b depict views of the bottom of the receptacle of FIG. 1a, including printed circuit board (PCB) assemblies carrying the electronic circuitry of FIG. 2 disposed within the receptacle bottom;

FIGS. 4c-4e depict covers for the PCB assembly of FIGS. 4a-4b;

FIGS. 5a-5b depict views of alternative bottom cover designs for the receptacle of FIG. 1a, including PCB assemblies carrying the electronic circuitry and battery of FIG. 2 disposed within the receptacle bottom;

FIGS. 5c-5d depict a cover that allows for replacement of a coin cell battery and access to programming contacts of the electronics of FIGS. 5a-5b;

FIGS. 6a-6b are perspective views of a volume receptacle programmer for programming multiple receptacles such as the receptacle of FIG. 1a;

FIG. 7 is a computer display screen showing a display editor for the receptacle of FIG. 1a;

FIG. 8 is an exploded view of the overlay of FIG. 1b, including the bistable ChLCD flexible display and a flat membrane switch for use with the receptacle of FIG. 1a;

FIGS. 13a-13c are front views of an alternative embodiment of the receptacle of FIG. 11 with optical windows disposed in the base top, and optics disposed in the base.

DETAILED DESCRIPTION

The disclosures of U.S. patent application Ser. No. 14/508,154 filed Oct. 7, 2014 entitled PROGRAMMABLE, INTERACTIVE DISPLAY RECEPTACLE WITH USE MONITORING AND INDEPENDENT ACTIVATION, DEACTIVATION, AND CHANGE CAPABILITIES, and U.S. Provisional Patent Application No. 61/887,712 filed Oct. 7, 2013 entitled PROGRAMMABLE, INTERACTIVE DISPLAY RECEPTACLE WITH USE MONITORING AND INDEPENDENT ACTIVATION, DEACTIVATION, AND CHANGE CAPABILITIES, are hereby incorporated herein by reference in their entirety.

A receptacle for a consumable or non-consumable material is disclosed that has a display affixed to a surface of the receptacle so as to conform to the shape of the receptacle surface. The display can be controlled by a receptacle controller and software, including a real time clock function, to activate, deactivate, and/or change the display by selected dates, times, and/or conditions. The display can be controlled by the receptacle controller to activate, deactivate, change, and/or keep fixed the display in response to a temperature sensor, an accelerometer, and/or any other suitable sensor input. A user can control the display for displaying selected animated and/or still visual images and/or text. The user and/or one or more sensors can further control the display to deactivate the display so that it will not turn on or change, thereby presenting an image and/or text that will remain fixed. The receptacle is configured to allow the user to interact with information communicated via the display, and to allow the setting of local time and date as well as the execution of selected software programs for operating one or more games or other programs in conjunction with the display. The display memory can be programmed and/or re-programmed by the user, a manufacturer, a distributor, and/or a re-seller of the receptacle via a hard-wired or wireless port. A molded, embossed or printed fixed image or form corresponding to, representative of, or otherwise having a connection to the images programmed in display memory can be located on at least part of the receptacle. The display further includes a thermistor located in the area of the display for providing display temperature information to the controller, which uses the information to provide temperature display compensation over the operational temperature range of the display, including display refresh timing and display voltage compensation, and to protect the display from over-temperature operation by deactivating, not activating, or not changing the display during such over-temperature conditions. The display is designed to avoid injury to the user in the event of unintentional improper use of the receptacle in a microwave oven.

Receptacle Electronics

Figure 1C:
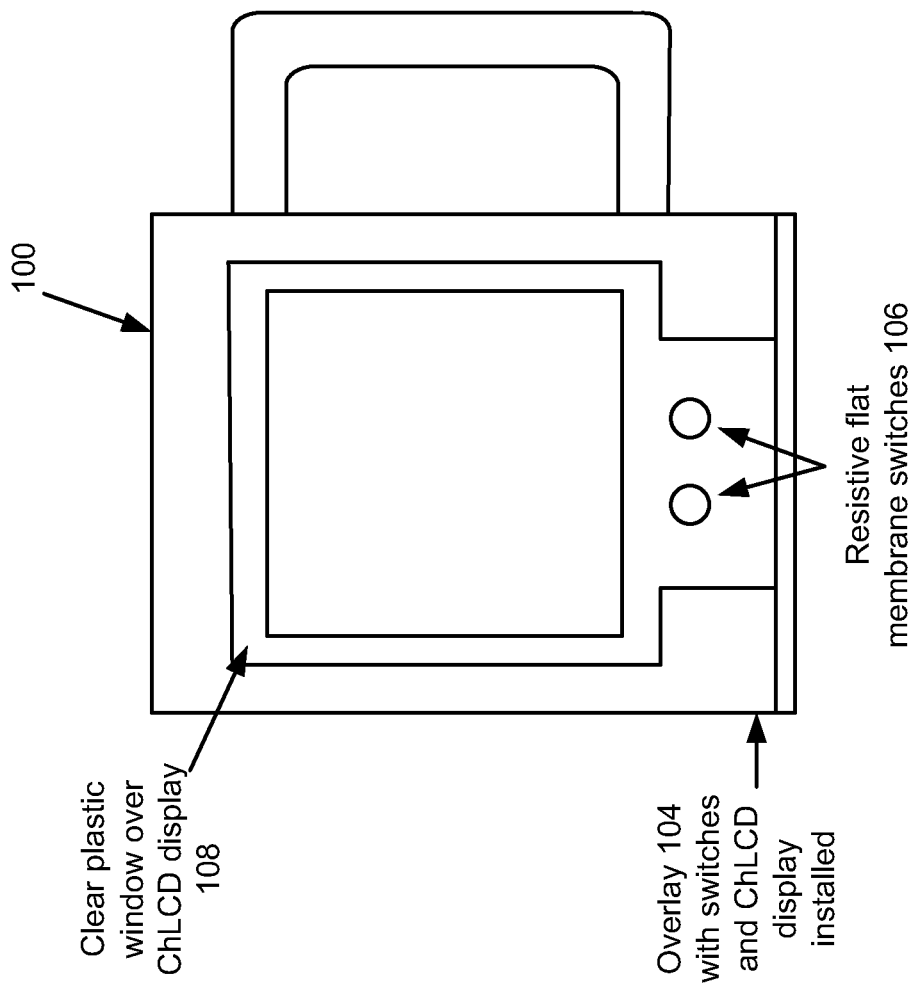
FIG. 1c is a side view of the receptacle of FIG. 1a having the overlay of FIG. 1b affixed to a surface thereof.

FIGS. 1a-1e depict an illustrative embodiment of a receptacle 100 for containing a consumable or non-consumable material, in accordance with the present application. The receptacle 100 has a printed circuit board (PCB) assembly 134 (see FIG. 1e) that can be disposed in its base 102 (see FIG. 1a) or in an overlay 104 (see FIG. 1e), a plurality of flat membrane resistive switches 106 (see FIG. 1c) that can be included in the overlay 104, and a flexible, bistable cholesteric liquid crystal display (ChLCD) 108 (see FIG. 1c). The overlay 104 can be affixed to the outside surface of the receptacle 100, as depicted in FIG. 1c.

Figure 2:
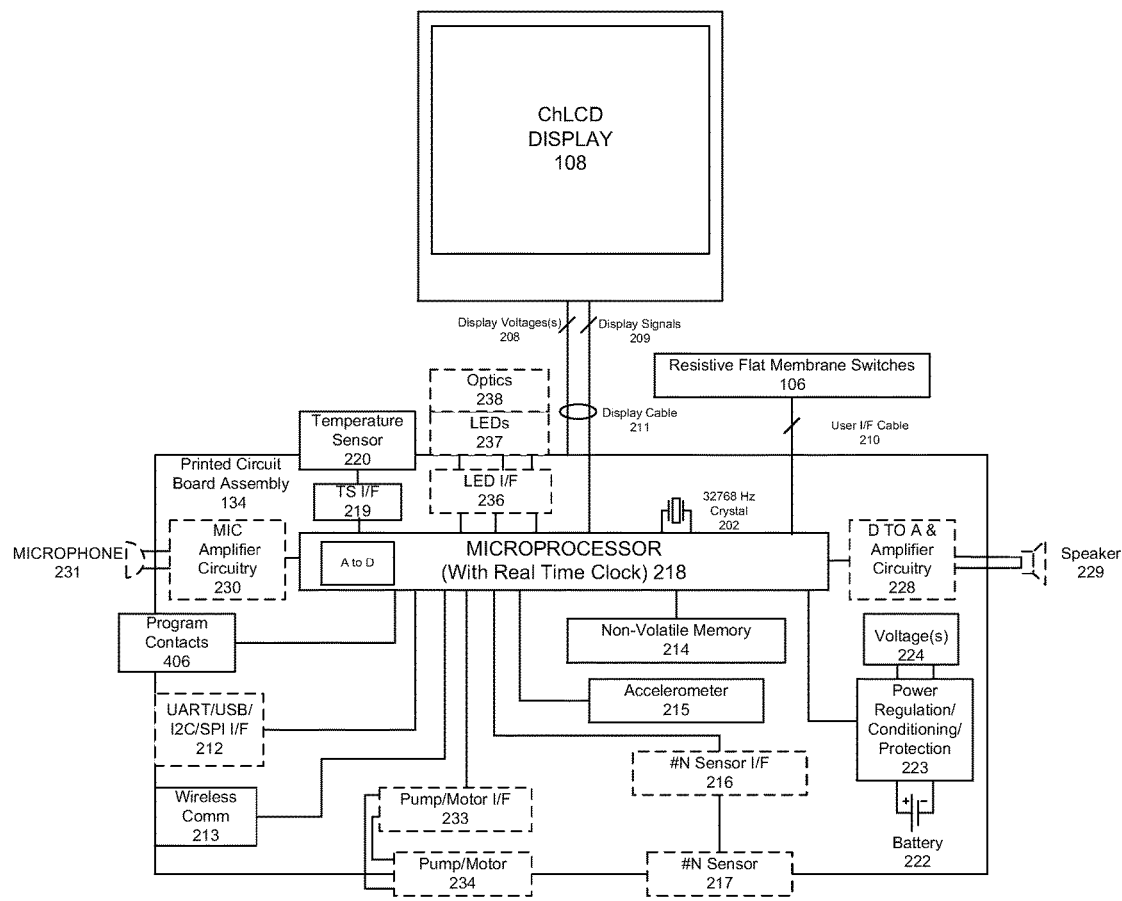

FIG. 2 depicts an illustrative embodiment of the receptacle electronics, which includes a battery 222, power regulation, conditioning, and protection circuitry 223 and voltage(s) 224 for powering the electronics, a microprocessor 218 having a real time clock function and a programmable memory, a 32768 Hz crystal 202, a programmable non-volatile memory 214, an accelerometer 215, an analog-to-digital converter (A-to-D) located in the microprocessor 218 connected to thermistor interface circuitry 219, a thermistor (temperature sensor) 220, a digital-to-analog converter (D-to-A) and amplifier circuitry 228 connected to a speaker 229, an RS-232 to infrared (IR) serial wireless communications transceiver 213, display signals 209 and display voltage(s) 208 within a flex cable 211 that bring power and signals to the bistable ChLCD flexible display 108, and a flex cable 210 that brings signals to the flat membrane switches 106 in the overlay 104. In addition, lines from the microprocessor 218 and/or the non-volatile memory 214 can be brought out to programming contacts 406 on the PCB assembly 134 directly or via wires/cabling to facilitate on-board reprogramming.

In the illustrated embodiment, the microprocessor 218 uses the precise 32768 Hz crystal oscillator 202, and is programmed to wake up once each second to keep track of the date and time (provided by the real time clock function), and to monitor receptacle use and temperature. The microprocessor 218 memory and/or the non-volatile memory 214 can be programmed to activate, deactivate, and/or change the display in response to the time and date provided by the real time clock function, the user interface(s) and use-monitoring sensor(s) such as the accelerometer 215 and switches 106, and/or the receptacle temperature sensor 220. The real time clock functionality can also be used to track use of the receptacle 100, including the receptacle temperature, orientation, degree of tilt, tapping, and/or velocity over time, and having the microprocessor 218 store the time stamped events in non-memory 218, which can then be used to enhance user interaction and to predict future use, allowing programs in the programmable memory 218 and/or the non-volatile memory 214 to activate and/or change the bistable ChLCD flexible display 108 accordingly. The microprocessor 218 can provide the commands and data to control and update the flexible display 108 ChLCD controller/drivers via an I2C or SPI serial communications bus along with the display (timing/control) signals 208. The voltage(s) 224 generated from the power regulation/conditioning and protection circuitry 223 and the battery 222 provide power to the electronics. The power protection circuitry 223 protects against possible reverse voltage (battery installed backwards) and/or over-current (battery overheating) conditions.

The power regulation circuitry 223 includes a DC-to-DC converter for higher voltage(s), as well as power on/off switching (e.g., a FET switch circuit controlled by the microprocessor 218), if required, for the display and/or alternative embodiments of the receptacle 100. The microprocessor 218 receives receptacle temperature information from the thermistor 220, and uses it to provide temperature compensation information and high temperature operation protection for the bistable ChLCD flexible display 108. When a high temperature is detected, the microprocessor 218 can control the bistable ChLCD flexible display 108 by keeping it fixed, or disabling it during over-temperature conditions. With other LCD technologies, temperature compensation may be in the form of a refresh rate or voltage adjustment. Alternatively, the thermistor 220 may be located within the plastic overlay 104 for temperature sensing closer to the bistable ChLCD flexible display 108. It should be noted that the temperature data may be used in determining when to activate a software program, and/or to re-fresh or change the display 108.

The microprocessor 218 can also be employed to generate sound by converting digital data stored in its memory to analog signals via the A-to-D converter and amplifier circuitry 228, which, in turn, drives the speaker 229. Pulse width modulation (PWM) audio signals generated in the microprocessor 218 may be used instead of the A-to-D conversion for cost reduction. The IR wireless communications provided via the IR transmit/receive unit 213 is bi-directional. The transceiver 213 communicates through an optical "window" 110 designed into the base 102 of the receptacle 100 to allow infrared signals to pass therethrough. Infrared communications uses pulsed light just below the spectrum of visible red to communicate. It is understood that wireless RF (radio frequency) communications may also be employed.

It is possible to have the electronics 134 and the battery 222 located behind the flexible display 108 and overlay 104, or have a totally self-contained display/electronics package 116 (see FIG. 1e), in which the electronics 134 including the battery 222, the flexible display 108, and the overlay 104 are sealingly enclosed. In this embodiment, the resulting overlay assembly may be programmed via the programming contacts 406 located in the back of the display/electronics package 116, and then affixed to the outside of the receptacle 100 (see, e.g., FIG. 1e). The IR window 110, when used, can be located on the front of the display/electronics package 116. The programming contacts 406 can also be located on the outside of the display/electronics package 116. A flap of plastic (not shown) with adhesive sealingly covers the programming contacts 406 after programming. Alternatively, the electronics 134 can be located in close proximity to the flexible display 108 and the overlay 104, and the base 102 can include a battery 222, the programming contacts 406, connections to a communications interface such as UART/USB/I2C/SPI 212, and the speaker 229.

Figure 9:
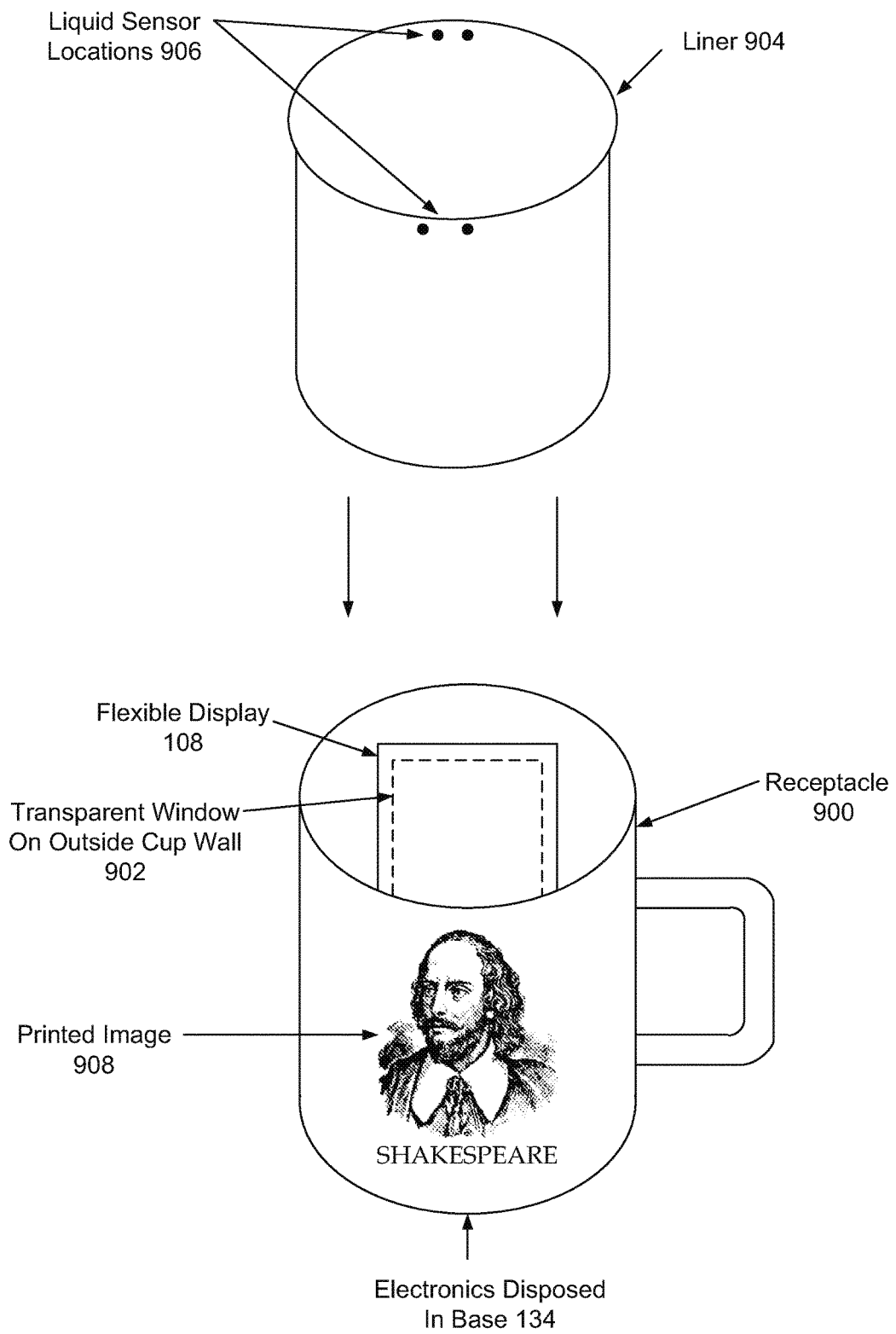
FIG. 9 is an exploded perspective view of an alternative embodiment of the receptacle of FIG. 1a including a receptacle liner, the flexible display being disposed between the liner and an outer wall of the receptacle, and a printed image on the outside of the receptacle, opposite the bistable ChLCD flexible display.

It is noted that the receptacle may be constructed as a double-walled receptacle 900 (see FIG. 9). For example, the receptacle 900 may include an outer wall 902 extending from the receptacle base, and an inner wall or surface (e.g., a liner) 904 disposed within the receptacle 900 to form a vessel for containing a consumable or non-consumable material (see FIG. 9). The liner 904 may be sealed to the outer wall 902 using ultrasonic welding, or any other suitable sealing technique. In this case, the flexible display 108 may be affixed to the inner surface of the outer wall 902 between the outer wall 902 and the liner 904, and the outer wall 902 may include a transparent window at least in the region of the visual display. Further, the receptacle printed circuit board (PCB) assembly 134, switches, sensors, etc., may be disposed in any suitable location. For example, the receptacle electronics (PCB) assembly 134 may be disposed within the receptacle base. Further, liquid sensors 906 may be located near the brim of the receptacle 900, as depicted in FIG. 9. For example, the liquid sensors 906 may operate resistively to detect when a user empties (e.g., drinks from) the receptacle 900. In this alternative embodiment, the overlay 104 may be omitted and the IR window 110 may be located on the outer wall 902 to allow for programming after assembly of the receptacle 900.

Programmable/Re-Programmable Memory

It is desirable to have as much flexibility as possible to program or reprogram the data and/or software programs contained within the microprocessor memory 218 and the non-volatile memory 214 for customization, updating, or otherwise changing the contents of the respective memories. For example, the microprocessor 218 memory shown in FIG. 2 can contain re-programmable flash memory, and have software programs and/or display data programmed either directly with a programmer using the programming contacts 406 or wirelessly via IR serial communications. Alternatively, the microprocessor 218 may contain memory for program execution and a separate non-volatile memory 214, which could be I2C EEPROM memory, SPI flash memory, (or any other suitable memory) usable for images, text, audio, programs, and/or games.

Contact Programming

Contact programming of the microprocessor 218 is accomplished via a programmer 602 (see FIG. 6a) connected to the programming contacts 406 on the PCB Assembly 134 (see FIG. 4a). There are one-time program (OTP) microprocessors that may be used, but they are generally not very flexible. Once programmed, they cannot be reprogrammed. Other memories are re-programmable like the flash-based microprocessor 218 (see FIG. 2). Re-programmable memory is preferred for custom applications, in which the electronics has been programmed and tested during PCB assembly and manufacturing. Then, at anytime, the memory can simply be re-programmed to the customer's application. With the electronics already fully tested, the risk of failure during re-programming is reduced. This is especially desirable when re-programming is being done after the electronics has been installed in the receptacle 100 and mated with the flexible display 108. For this reason, initial programming will, in most cases, be done before PCB assembly manufacturing, or during PCB assembly manufacturing while the PCB assemblies are still in "panels".

Once the PCB assembly 134 has been installed in the receptacle 100, contact programming is still possible, but the programming contacts 406 need to be accessible to the programmer connector during programming, and protected from the environment during use of the receptacle 100. FIGS. 4a-4e and 5a-5d illustrate different designs that allow access to the program signals on the PCB, and provide a seal when not programming. A key 408 (see FIG. 4b) has been designed to assure proper orientation of the programming connector. Other designs for assuring proper connector orientation are possible. Programming contacts may also come from wires connected to the program signals on the PCB assembly 134. It is noted that the designs of FIGS. 4a-4e and 5a-5d can also facilitate the replacement of batteries. Program covers 410, 412 (see FIGS. 4c-4e) and 510 (see FIGS. 5c-5d), or a bottom cover 310 (see FIG. 3d), may also be thermally sealed by an ultrasonic technique by heating up the plastic around the seal of the cover.

In many applications, it will be desirable to reprogram the non-volatile memory 214 directly. For such applications, the memory may be programmed via the programming contacts 406 on the PCB assembly 134 or via the microprocessor 218. For direct non-volatile memory 214 programming, the design configurations of FIGS. 4a-4e and 5a-5d may be employed. When programming the non-volatile memory 214 directly using the programming contacts 406, one of the program signals can be used to control the microprocessor 218 communications interface to non-volatile memory into an "off" or high impedance state so that it will not interfere with the programming of the non-volatile memory 214.

In cases where large volumes of receptacles are being programmed, a fixture 600 (see FIGS. 6a-6b) can be used to help facilitate the programming or re-programming of many receptacles at one time. Receptacles are placed in the receptacle programming fixture 600 for programming. It is noted that a slot 604 (see FIG. 6a) is used as a "key" to assure proper receptacle orientation. A wall that continues the outline of the receptacle extends down below the receptacle opening 606 (see FIG. 6a) to guide the receptacle properly into the fixture 600. Once programmed, the receptacles are removed and the program covers (see, e.g., FIGS. 3d, 4c-4e, and 5c-5d) are installed. The fixture 600 (see FIG. 6a, 6b) can be expanded to allow programming as many receptacles at one time as is practical.

Programming Via Communications Port

Another manner of programming or re-programming the receptacle 100 is via a communications port on the microprocessor 218. Communications to the microprocessor 218 for this purpose may be by PCB contact to a communications interface (like a serial port on a PC), in which the design configurations of FIGS. 3a-3d, 4a-4e, and 5a-5d can be used as ways to access the programming contacts 406 on the PCB assembly 134 within the receptacle 100. Another form of communications is wireless, as represented by the IR transmit/receive unit 213 of FIG. 2. In this case, an RS-232 to IR adaptor on a PC serial port may be used to interface with the IR port in the receptacle 100. The closer the IR adaptor is to the receptacle 100, the less power will be required to reliably communicate. This can be important with the use of coin cell or other small type of batteries, especially if the battery is not replaceable.

To further limit power used, only a receiver in the receptacle 100 is needed for programming or reprogramming. At the end of programming, a "checksum" may be generated and sent by the PC or other programmer 602. This checksum would also be computed in the receptacle microprocessor 218. If they were the same, then that would indicate that programming was successful. A simple checksum status indicator may be shown on the flexible display 108 when programming is completed. If programming were unsuccessful, then it may be tried again until success was achieved (assuming a fully functioning receptacle). In addition, software in the receptacle 100 can be designed to activate only the IR receiver under specific conditions, e.g., when certain areas are touched simultaneously on a touch panel or by simultaneous contact with the two membrane switches 106, while the accelerometer 215 senses the receptacle 100 is upside down, or on its side, or after the accelerometer 215 detects a sequence of "taps" on the receptacle 100. This would further conserve power by effectively limiting the amount of time the IR port is used. This power limiting technique can be used with whatever sensors or switches are incorporated into the receptacle 100. This feature may be added into the programming fixture 600 so that when the receptacles are installed, the switch, transducer, or sensors are used to indicate that "programming" is automatically activated. Time can also be used as an indicator for programming or re-programming. An example of this would be for the user to hold a switch or combination of switches for a period of time longer than would normally occur during regular use. This may be used as an indication in the receptacle software to test the IR port for programming.

When non-volatile memory 214 is being programmed via a communications port, the receptacle microprocessor 218 takes the data from the communications device and writes the data into non-volatile memory 214, which may be EEPROM memory, flash memory, or any other suitable type of programmable memory.

If the memory to be programmed through a communications port is in the microprocessor 218, "boot loader" software may be needed within the microprocessor 218 to facilitate the communications and the programming. The boot loader software is the communications and programming software that allows the microprocessor 218 to reprogram the rest of its memory. The boot loader software includes communications software required to receive the program data, and self-programming software required for writing the new program data into memory. IR communications (see FIG. 2) allow for programming without opening the receptacle 100. This can be accomplished with a personal computer having an RS-232 to IR adapter connected to the RS-232 serial port and some suitable software. The user can accomplish this type of programming using his or her own personal computer, an RS-232 to IR adapter, and some suitable software installed on the personal computer.

Memory program data may be sent to the receptacle 100 via the Internet. The receptacle 100 may be programmed without the user being present as long as the receptacle was located approximately in the proper position for the IR interface to communicate, and the software program to program the receptacle 100 was operating on the computer. For example, new quotes of the day, images, songs, etc., may be programmed automatically into the receptacle 100 so that they are available each morning. Alternatively, the user may select from different programs on the Internet, i.e., which ones he or she would like, download the file, and initiate the programming of their receptacle 100. Another application would be for the user to be able to insert his or her text, images, and/or sounds via a program that would then create a file compatible to the memory for programming. The wireless communications port 213 could also include an Internet, NFC (Near Field Communications) or Bluetooth, magnetic communications, or other wireless interface to interface to computers, smart phones, wireless routers, etc. Use data for the receptacle 100 can be uploaded to web sites and be used for consumer use data, or as input to customize future receptacle programs.

Figure 7:
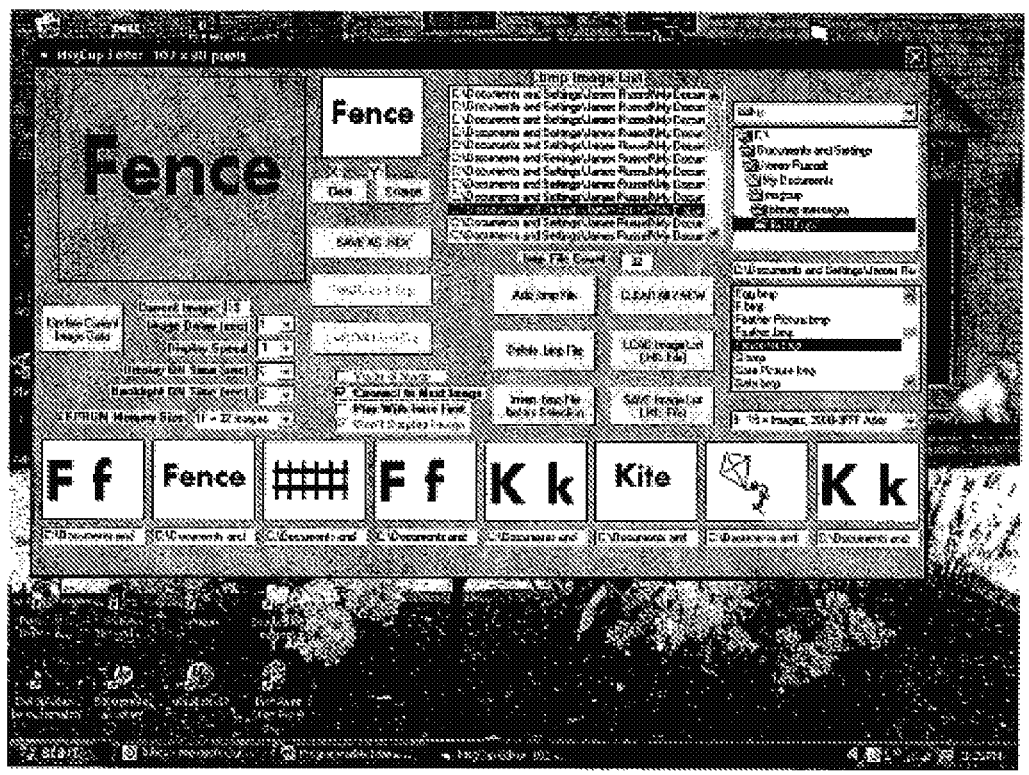

Custom programming for the receptacle 100 may be accomplished in much the same way at the reseller level. For instance, at a kiosk, the reseller may work with the customer on what text, images, and/or sounds he or she would like to have for their receptacle, and program the receptacle for them. In this case, programming may be accomplished via the programming contacts 406 or via wireless communications 213 using a personal computer, a wireless interface to the receptacle, and display (image, text, and sound selection) editing software (see FIG. 7, which depicts an illustrative display screen corresponding to the display editing software). After selecting text, images, sounds, attributes, etc., the display editing software can create a formatted file that is compatible with the receptacle 100 control software program, programming memory 214, and communications 213 for the programming memory 214, and then download the formatted file to the receptacle 100 via the communications port 213 or 406.

The display editing software may be employed by the user, a manufacturer, a distributor, and/or a re-seller of the receptacle to select the desired displays (e.g. video images, text, photos, names, dates, audio, etc.) for the receptacle. For example, the display editing software allows the user, the manufacturer, the distributor, and/or the re-seller of the receptacle to select programs or games, to select the conditions under which the display and/or programs will operate, change, not change, and deactivate, to select a main display and an introduction display that may be displayed for a predetermined period each time before displaying the main display, to select multiple displays that may be displayed in a sequential manner, to specify the time period from when the receptacle electronics is initially turned-on to when the display is activated, to specify the time period during which the display remains activated, etc. Alternatively, the display editing software may be used for selective programming, where the main program does not change, but selected text, images, and/or sound are programmed. Examples of this would include a date, an occasion like a birthday, a holiday, or an event, the name of a person, a company, or an organization, a lottery number or prize, etc. These selected items may be programmed to appear independently or together with programs, games, and/or other text, images, or sounds, and may be displayed at any combination of predetermined times, randomly using pseudo random number generator software, or after user inputs like membrane switch 106 or sensor 215, 216 inputs.

Figure 6A:
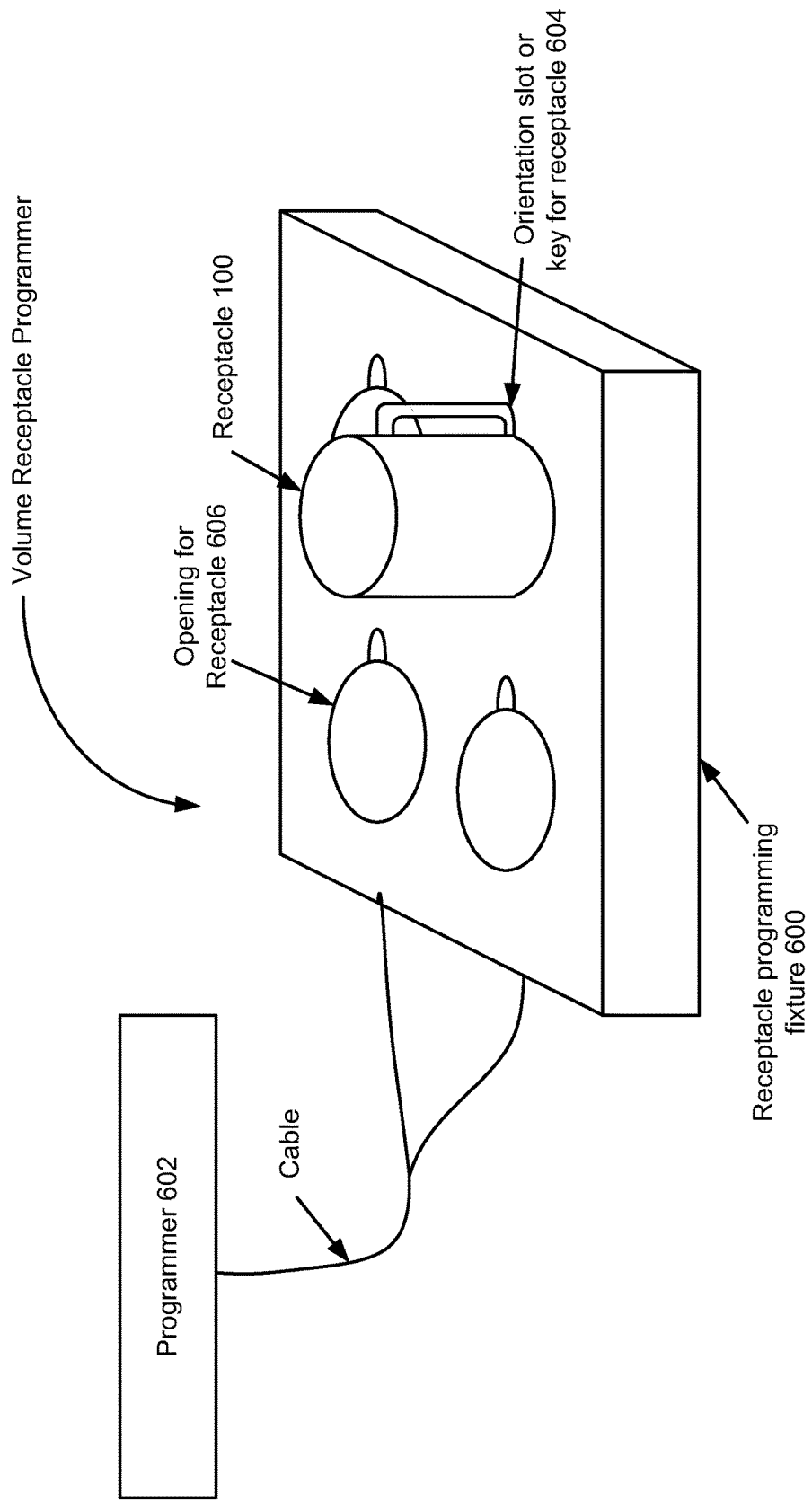
Figure 6B:
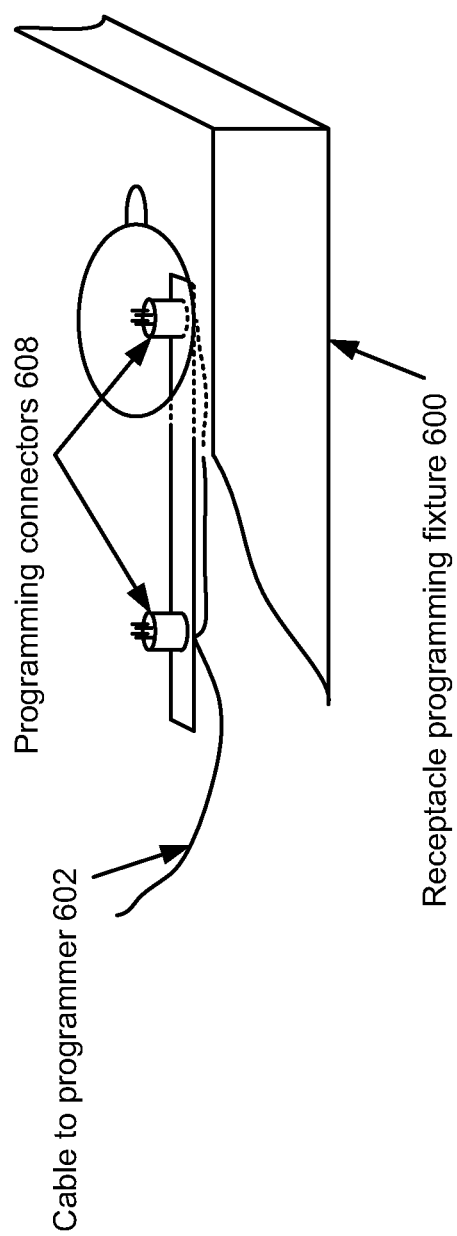

Volume orders of display receptacles that all contain the same software program may be more effectively programmed at the distributor level. In this case, the volume receptacle programmer, as shown in FIG. 6a, is a practical solution. It provides for a quick, simple, and reliable way of connecting multiple receptacles 100 to programming connectors 608 (see FIG. 6b), where the receptacles 100 can now be programmed with a standard programmer (see reference numeral 602). Direct programming of the microprocessor 218 and/or non-volatile memory 214 is typically much quicker than programming via serial communications. If the receptacles 100 have wireless communications 213, they also may be programmed in volume. A simple "broadcast program" command may be given to all of the receptacles 100 within the wireless transmission range and/or the line of sight. The receptacles 100 can also have unique IDs located in the microprocessor 218, non-volatile memory 214, or wireless communications 213 that allow the programmer to program and verify programming of specific receptacles. Program verification can also include checksums sent back to the programmer and/or displayed on the display 108. In addition, the programmer can send customer specific information to the receptacle 100, such as the customer order number, name, and mailing address, and program information, such as the program name, number, and version. Any or all of this information can later be displayed on the flexible display 108, or read back via the communications port, such as via the wireless communications 213. Alternately, if programming is not successful, the flexible display 108 may display nothing, an error code, or an indication that programming of the receptacle 100 did not occur or was unsuccessful. A security program may protect some or all of the programming information so that only those with security software can access the information.

The receptacles 100 can be molded, embossed, or printed with a fixed image 908 or form on at least a portion of the receptacle that corresponds to, is representative of, or otherwise has a connection with the specific user, group, organization, theme, or subject that was programmed into display memory, thereby enhancing the receptacles' designed purpose. Fixed image printing may also include a unique identifier for the receptacle 100 located at any suitable location on the receptacle 100 that can be scanned, including by a cell phone or other electronic device with scanning capabilities. This identifier can identify the receptacle 100, and can be connected with information about the receptacle 100, its owner, others associated with the receptacle 100, rights, privileges, and opportunities of the receptacle 100, etc. Such rights, privileges, and opportunities can change over time by an individual, company, group, or organization associated with the receptacle 100, depending on how the receptacle 100, is used, where it has been, and/or some action performed by the user that would justify a change by the individual, company, group, or organization. Such a privilege may include winning a prize by random selection or other means. RF or other communications from the receptacle 100 to a cell phone or other electronics device can be used to access the same information.

Collaboration of customizing programmable display receptacles 100 can be optimized via web pages on a web site, allowing individuals, groups including social network groups, organizations including non-profit groups and for profit companies, or all such web site participants to collaborate on selecting and creating programmable display receptacles 100. Any individual that initializes a custom receptacle 100 can become the owner of the custom receptacle 100, unless or until the individual assigns ownership to someone else. The owner can identify all other participants, including individuals, groups, organizations, or all such web site participants that are allowed to collaborate on creating the custom programmable display receptacle 100, at what stages they can collaborate, and who can purchase or receive the custom receptacle finished product. The first stage can include selecting or uploading a receptacle 100 material type, style, and color, including any unique form(s) or embossing and/or a boarder around the display 108, and may also include additional standards or options including the user interface 106, sensor(s) 215, 216, display activation and/or other features available for the receptacle 100. This stage could include uploading, selecting or creating models and drawings that can be used to create a mold or work with a 3-D printer for making a receptacle 100, a portion of the receptacle 100, or an add-on to the receptacle 100. The second stage can include optionally selecting or uploading any desired fixed image(s) 908 for the receptacle 100, and identifying location(s) on the receptacle 100 where they will be printed if there is more than one location available. The third stage can include selecting, uploading, and/or creating visual and/or audio data including voice, music, text, (including quotes, sayings, jokes, and questions followed by answers), images, games, or programs along with attributes associated with the video display images, and audio data including date and time for selected images and audio to be displayed/presented. The first, second, and third stages described herein do not have to be performed in a particular order. The owner can have the final say on all such receptacle customization and provide final approval. All individuals, groups, and/or organizations that have been approved by the owner of the receptacle 100 can purchase or receive the programmable display receptacle 100 by placing orders.

Flexible Flat Display

Figure 1D:
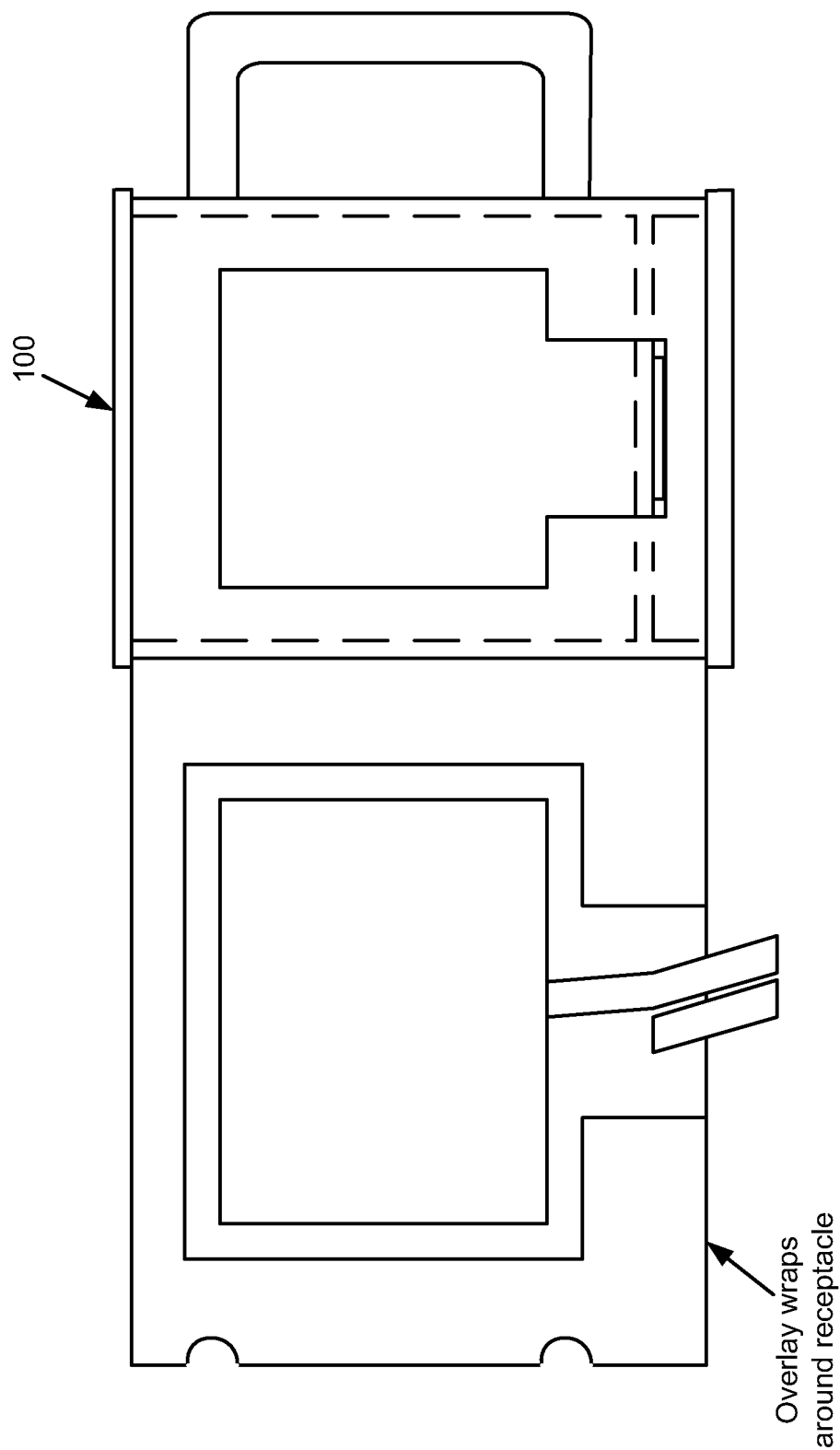
Figure 1E:
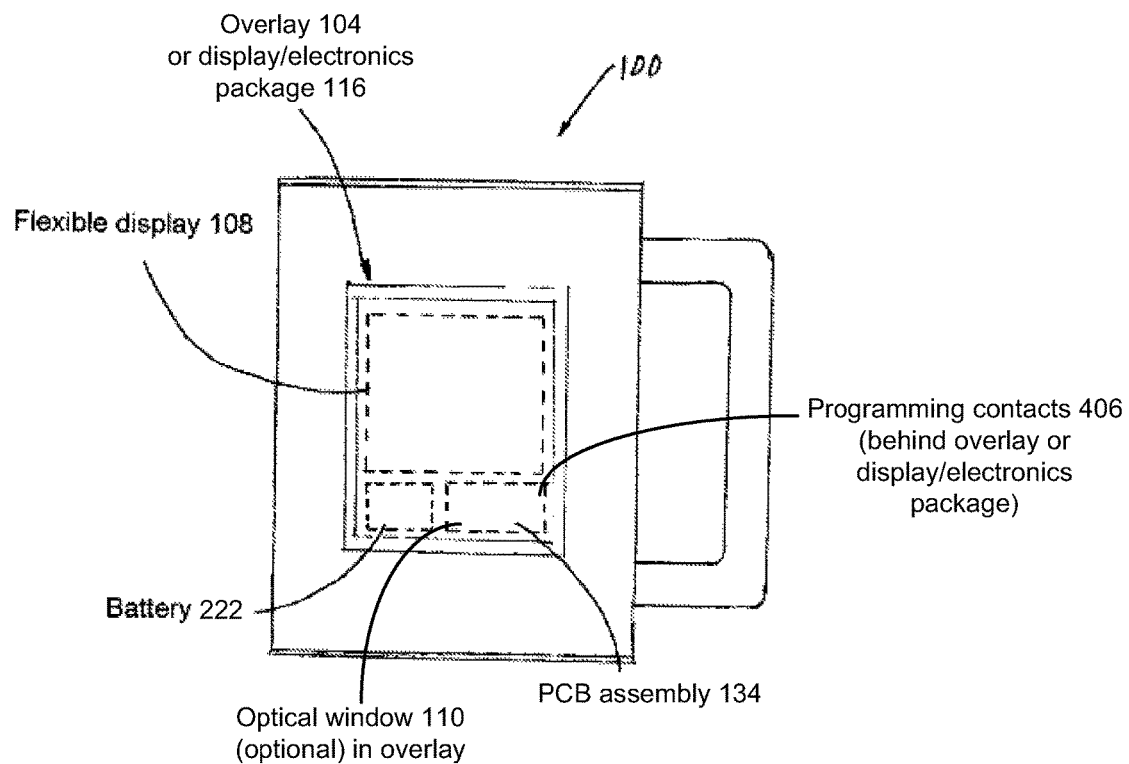
FIG. 1e is a side view of the receptacle with a location for electronics and a battery with the display, the electronics, and the battery located either behind the overlay, or in a sealed, self-contained package that includes the overlay affixed thereto.
Figure 8:
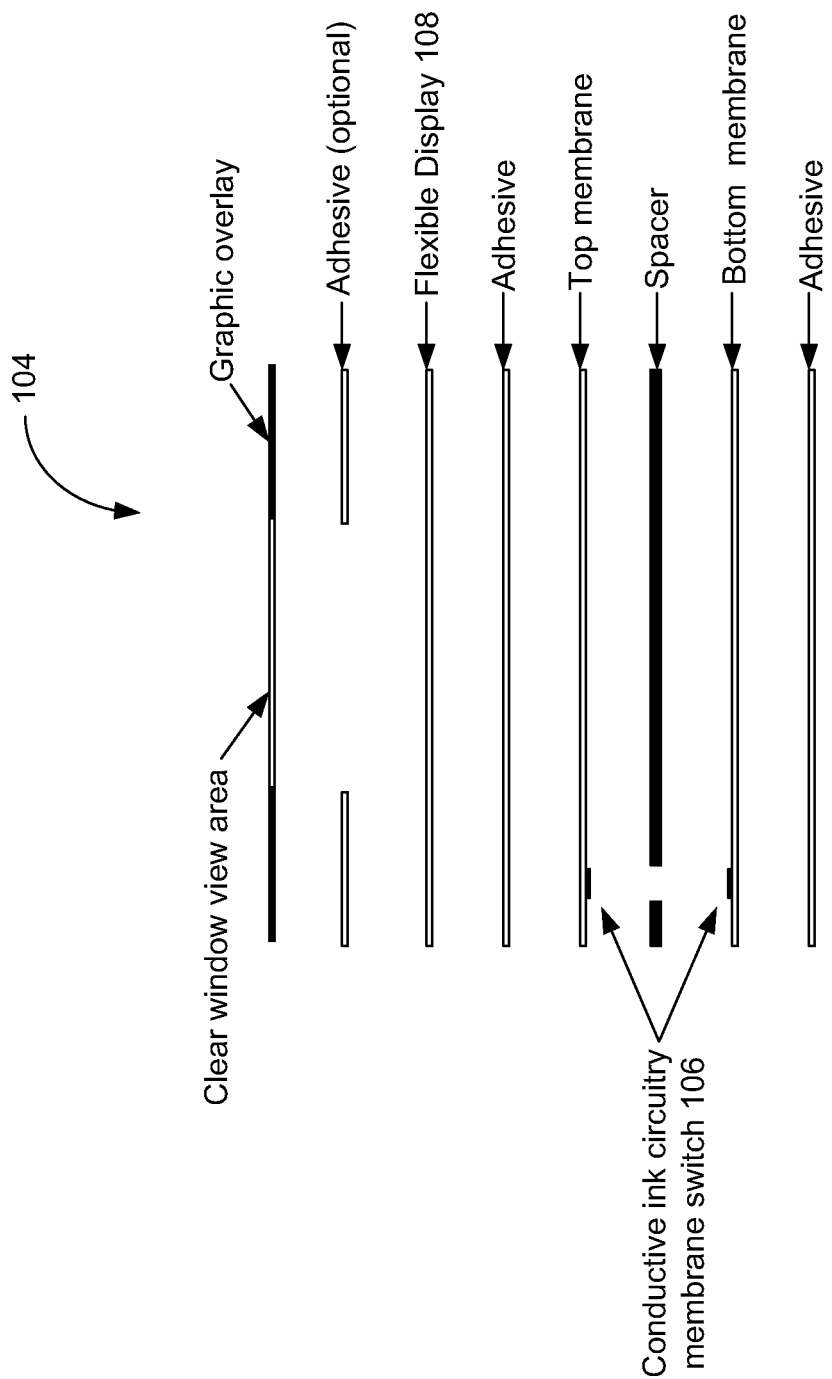

FIG. 1c illustrates the programmable, interactive receptacle 100 with the bistable ChLCD flexible display 108. The flexible display 108 is housed with a plastic overlay 104 that includes a clear plastic window over the visible display area (see FIG. 1c). FIG. 8 depicts the layers of the overlay 104 including the flexible display 108 and the flat membrane switch 106. The receptacle 100 has an impression 112 (see FIG. 1a) formed in a surface thereof where the overlay 104 is to be installed. This impression 112 allows for a small amount of clearance between the back of the flexible display 108 and the receptacle 100, providing for the addition of thermal insulation from the receptacle wall to protect the flexible display 108 from high temperatures in the receptacle 100. During installation of the overlay 104, the flex cables 210, 211 are inserted through a slot 114 (see FIG. 1a) in the base 102, and the perimeter of the overlay 104 is then adhered to the outside edge of the overlay impression 112 in the receptacle 100. The overlay 104 may have an adhesive around its perimeter covered by a tape. When the tape is removed, the overlay 104 is ready to be adhered to the receptacle 100. With the self-containing display/electronics package 116, the adhesive would cover the entire back of the package 116 for a complete adhesive coverage. The overlay 104 may cover a portion of the receptacle 100, or it may wrap around covering most or all or the receptacle 100, as shown in FIG. 1d.

ChLCD bistable flexible display and other bistable substrate display technologies have specific advantages over traditional LCD technology for use in receptacle displays. For example, bistable ChLCD flexible displays can use a plastic substrate instead of the glass substrate found in traditional LCD displays, allowing it to be flexible and curve to the radius of the receptacle. Other advantages bistable ChLCD flexible technologies have over traditional glass substrate LCD technologies include the following: they are much lighter and thinner, allowing for installation onto a receptacle with minimal impact on the mechanical aesthetics of the receptacle; they do not require a backlight, further simplifying the design; they do not use a polarizer, and thus provide a wide viewing angle and excellent readability of curved surfaces; and, they can maintain the display of an image with no power, and only use power when the contents of the display change. This allows the flexible display 108 to keep its last image or text for an indefinite time period or until the display changes without using additional power, and provides for lower power operation for many applications, thereby extending the range of such applications to where the battery may not need to be recharged or replaced. This in turn provides for lower product costs by using a simpler environmental seal (or no environmental seal with wireless programming) for the electronics. Also, flexible substrates are less prone to breakage, and are generally more durable.

It is noted that because no polarizer is used with bistable ChLCD flexible displays, it is recommended that some type of ultraviolet (UV) protection be used with the display. Such UV protection may be in the form of a thin transparent film installed during the manufacture of the bistable ChLCD flexible display, may be part of the display window of the overlay, or may be provided in any other suitable form. Other flexible display technologies include OLED (Organic-Light-Emitting-Diode) and electrophoretic flexible displays, etc. Substrates for flexible display technologies may also include metals and/or flexible glass. The use of a plastic or glass overlay technology can provide an effective seal against adverse environmental conditions through the effective use of plastics, glass, adhesives, and vacuum seals, where applicable. In addition, a border can be added around the display 100 edge to provide an additional seal and/or to enhance the receptacle 100 design. Environmental sealing through the use of ultrasonic welding or any other suitable sealing techniques may also be provided when the flexible display 108 is disposed between the two walls of a double-walled receptacle.

User Interface

The user can interact with and control the flexible display 108 of the receptacle 100 via a user interface. As shown in FIG. 1c, the user interface may comprise the two resistive flat membrane switches 106 incorporated into the overlay 104. The user interface can be used to activate, deactivate, or keep the display unchanged. For example, it can be used to deactivate the flexible display 108 and/or the audio component, and/or keep the text and/or image(s) displayed on the flexible display 108 fixed both before and while washing or transporting the receptacle 100. The user interface can be used to change what is being displayed on the flexible display 108 anytime the user wants to view a different display. The user interface can be used to keep the current display from changing so that the existing image and/or text will stay fixed on the flexible display 108 even when other conditions associated with the receptacle 100 would normally change the image and/or text on the flexible display 108. The user interface can also be used to select the visual and/or audio content. For example, it can be used to select audio content like songs, and/or visual content like still pictures or images.

The user interface can also be employed to interact with the receptacle 100. For example, it can be used to interact with questions communicated visually by the flexible display 108, or aurally by the audio component. It can also be used to interact with audio and video games and other programs running from software in the electronics of the receptacle 100. The user interface can also interact with video and audio that is controlled by a third party via communications, such as IR or RF wireless communications 213. For example, a customer may empty his or her receptacle 100 configured as a mug or cup, a third party may update the flexible display 108 on the mug or cup via IR or RF wireless communications, and the customer may then read on the updated display 108 that he or she has won a free refill.

The user interface can be located anywhere on the receptacle 100. For example, FIG. 1c shows the user interface in the form of the two resistive flat panel switches 106 on the outside surface of the receptacle 100. Another location for some or the entire user interface may be on the bottom of the receptacle. For example, audio, video, and/or electronics on/off switches may be located on the bottom of the receptacle 100. If there is a receptacle carrier, then the user interface may be located anywhere on the receptacle carrier, a removable receptacle insulator, or a receptacle cover.

The user interface may be operated through direct user contact. This can include resistive and capacitive switches and touch screens, conductive switches, pressure switches such as piezo switches, the blockage or admittance of light in optical sensors, etc. The user interface may also operate indirectly via sensors that sense changes in the receptacle 100 or changes in the contents in the receptacle 100. This can include the receptacle electronics being responsive to (1) sound and/or changes in sound, (2) changes in the angle of the receptacle 100, (3) changes in the liquid level within the receptacle 100, (4) the presence or absence of liquid within the receptacle 100, (5) changes in the temperature of the receptacle 100 or the temperature of the liquid within the receptacle 100, (6) changes in the acceleration, deceleration, direction, angle, and/or orientation of the receptacle 100 via monitoring of the accelerometer 215 and/or an optional magnetometer. All of these changes are directly or indirectly controlled by the user, and can be employed singularly or in combination to interact, activate, select, and/or change the audio and/or visual displays and programs that control the operation of the flexible display 108 and the audio component.

Receptacle/User Use and Status Monitoring

Constant monitoring of data from the temperature sensor 220, the accelerometer 215, and the microprocessor 218 can be combined to interpret the use of the receptacle 100. The microprocessor 218 can execute its program in response to how the receptacle 100 is being used by activating, deactivating, changing, or keeping fixed what is displayed on the flexible display 108 and/or what is emitted from the speaker 229. For example, when the receptacle 100 is being hand washed, the movements of the receptacle 100, including such movements involving beverage non-consumption angles, velocity, back and forth motion, and orientation, can indicate that it is not in the normal liquid consumption mode, and, in response, the microprocessor 218 can execute its program to deactivate the speaker 229 and fix any text and/or image(s) on the flexible display 108. If the receptacle 100 were accidentally put into a dishwasher and the temperature sensor indicated a constant rise in temperature, the display will be deactivated. The accelerometer 215 senses when the receptacle 100 is placed upside down, and, after a period of time (detected by the real time clock function or other timer), the microprocessor 218 program will re-orient the image on the display to be right side up until the accelerometer 215 senses that the receptacle 100 is being used again, thereby triggering the microprocessor program to re-orient the flexible display 108 image to its normal position.

The real time clock function in the microprocessor 218 can be used in combination with the sensors 220, 217 and the accelerometer 215 to provide appropriate delay times before changing the flexible display 108 and/or the speaker 229 content after a change has been detected in order to validate what it is that had changed. The real time clock function in the microprocessor 218 can also be used with the accelerometer 215 to determine what time of day the receptacle 100 is being used. When the receptacle 100 is being first used in the morning, it may change the display 108 and/or the speaker 229 content to, for example, "first use in the morning" themed content. Conversely, when the receptacle 100 is being used late in the evening, the display 108 and the speaker 229 content can be changed to "late night" themed content. The real time clock or other timer in the microprocessor (218) can be used to time events in, or within a day (including morning, noon and night), week, month, year (including the four seasons, birthdays, anniversaries, holidays, etc.) or years. The real time clock function in the microprocessor 218 can also be used to anticipate subsequent use so that the display 108 can be changed before the receptacle 100 is actually used for the first time on a given day. The user could interpret such a change on the display 108 as a "greeting" by the receptacle 100. It is noted that, if the receptacle is upside down, the "greeting" on the flexible display 108 can be re-oriented to be read right side up. When the accelerometer 215 subsequently senses movement, the flexible display 108 can be re-oriented to its normal position.

The functionality of the accelerometer 215 can be combined with that of the real time clock function or other timer to sense when the receptacle 100 is being used, as well as the stage of consumption of any liquid in the receptacle 100. The accelerometer 215 can detect movement (direction, velocity, and angle) specific to consumption use, including the stage of consumption (as sensed by the angle of the receptacle during consumption). The microprocessor 218 program can change the flexible display 108 and/or the speaker 229 content in relation to the stage of consumption, e.g., full, almost full, half full, almost empty, or empty, such that the display 108 and/or speaker 229 content is sequenced with the beginning of a video, quote, subject, theme, question, sound, song, game, or program, followed a middle and an ending corresponding to the beginning, middle, and ending of the consumption of the beverage. The display 108 and/or the speaker 229 content can also change in response to, for example, how long it takes for the liquid to change or be consumed, how many "cups" in a day the user is consuming, etc. The accelerometer 215 can also be used with or without the real time clock function to sense when the user picks up the receptacle 100, brings it toward them, begins to drink, and moves the receptacle 100 away after drinking, as well as when the receptacle 100 has been placed down on a solid, level surface. At anytime during the process of the user taking a drink, the visual and/or audio content provided by the flexible display 108 and/or the speaker 229 can activate, change, or deactivate.

The temperature sensor 220 can also be used with the real time clock function to detect when hot or cold liquid is first put into the receptacle 100, and the change in temperature over time of the receptacle 100. This data can then be used by the microprocessor 218 program to activate, change, keep fixed, and/or deactivate the display 108 and/or the speaker 229.

Receptacle Safety

In applications where the receptacle 100 may hold a warm liquid like coffee, the user may unintentionally use the receptacle 100 improperly by trying to heat up the contents of the receptacle 100, for example, in a microwave oven. Even if a notification or warning specifically prohibiting the use of the receptacle 100 in a microwave oven is written on the receptacle 100, for example, on the bottom of the receptacle 100, there is no guarantee that the user would read the notification or warning, or even if they did, abide by it. The receptacle 100 contains the PCB electronics 134, the battery 222, and the flexible display 108 that, when exposed to microwaves, could heat up due to excessive electric currents generated across resistive conductors. The generated heat could melt or crack the receptacle 100, resulting in the potential of hot liquid or hot PCB electronics 134, battery 222, and/or contents of the battery 222 or the receptacle 100 coming in contact with the user. Therefore, any such receptacle 100 that could mistakenly be used in a microwave oven should be designed to avoid injury to the user. The following approaches, individually or in combination, can be used to reduce the possibility of such injury to the user:

a) Select the receptacle 100 wall and base materials to be ceramic, metal, or any other suitable material that will be resistant to heat generated by the PCB electronics 134, the battery 222, and the display 108 such that it will not crack or break, or alternatively add metal to the outside of the receptacle such that is visible to the user, thereby discouraging microwave use, and may also create a noise when placed inside an operational microwave oven, thereby alerting the user;

b) The PCB electronics 134 and the battery 222 can be effectively shielded from RF microwave radiation by a metal enclosure, provided that the metal enclosure is of sufficiently low resistance so as to not heat up significantly when exposed to microwaves. It is recommended that care be taken to minimize any metal corners that would create issues while in an operating microwave oven;

c) It is noted that the batteries 222, if left unshielded, could heat up and have the potential to cause harm when exposed to microwaves. If the battery 222 is in an unshielded portion of the receptacle 100, but has a metal (low resistance) case like a coin cell battery, it may be sufficiently protected from microwaves, but could still be exposed to heat from the nearby PCB electronics 134 heating up. In this case, the battery 222 should be thermally isolated (e.g., via distance or by thermal insulating material) away from the PCB electronics 134 and the display 108 such that it will not be exposed to potentially hazardous temperatures. Coin cell batteries such as Rayovac Lifex have higher operating and non-operating temperatures, and therefore may be less susceptible to heat. Such coin cell batteries also include carbon-monofluoride electrode material and a non-corrosive, non-toxic electrolyte. In addition, the battery 222 should be protected from over-heating from shorting by using a resistor in series with the load. This will prevent overheating of the battery 222 due to over-current from a short circuit;

d) It is further noted that, when using adhesives to secure the display 108, the overlay 104, the bottom cover 310, and/or other compartment seals, it can be beneficial to use food-safe adhesives that will be resistant to the maximum temperature the receptacle 100 may be exposed to in a microwave oven to prevent the hot bottom cover 310, PCB electronics 134, battery 222, or display 108 from coming loose and falling onto the user;

e) Secure parts exposed to heat with a mechanical means such that they will not become compromised when heated. This can include the bottom cover 310, the overlay 104, and the display 108;

f) Design the receptacle 100 such that components located on the outside of the receptacle 100 have minimal mass. An example of this would be locating the cholesteric liquid crystal display 108 and the overlay 104 (lower mass components) on the outside of the receptacle 100, and locating the PCB electronics 134 and the battery 222 (higher mass components) on the inside bottom of the receptacle 100 or otherwise secured so that more protection can be provided to these components; and g) Provide the PCB electronics 134 with the ability to detect when microwaves are present by sensing the temperature, voltage, current, and/or resistance of a microwave sensitive component, or the generation of energy by a microwave sensitive energy harvest component and to sound an alarm while the PCB electronics 134 are still operative.

Alternative Embodiment—Gas Receptacle

Figure 10:
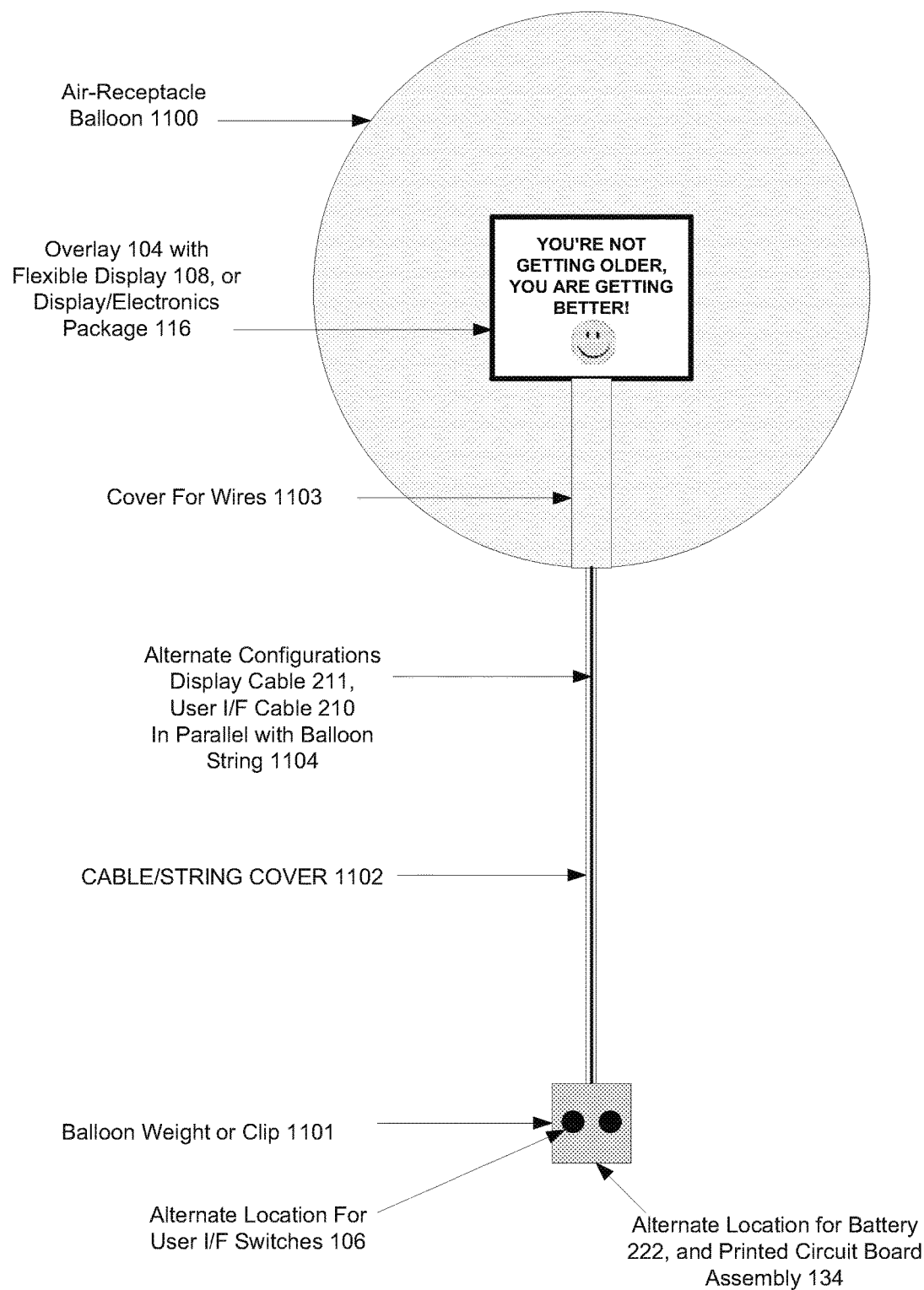
FIG. 10 is a front view of an alternative embodiment of the receptacle of FIG. 1a with the display and electronics mounted on a balloon with a string and a weight or clip.

An alternate embodiment of the receptacle 100 would be a receptacle for holding a gas such as air or helium. An example of this would be a balloon. FIG. 10 depicts a foil or Mylar balloon 1100 with the flexible display 108, the overlay 104, the PCB electronics 134, and the battery 222 attached to the balloon 1100 in the display/electronics package 116. The display control switches 106 can be disposed in the balloon weight or clip 1101. The electrical connection between the switches 106 and the microprocessor 218 is via the user I/F cable 210. The user interface (I/F) cable 210 can include lines for programming, and the programming contacts 406 that can be located in the balloon weight or clip 1101 for ease of programming. Optionally, the display control switches 106 and the programming contacts 406 can be with the PCB electronics 134 and the battery 222 packaged in the display/electronics package 116.

When packaging the flexible display 108 and overlay 104, the PCB electronics 134, the programming contacts 406, and the battery 122 in the totally self-contained display/electronics package 116, the microprocessor 218 programmable memory, and the non-volatile memory 214 can either be programmed first and then affixed to the balloon 1100, or programmed after they have been affixed to the balloon 1100. The programming contacts 406 can also be located in either the rear or front of the display/electronics package 116.

The overlay 104, the cholesteric liquid crystal display 108, the PCB electronics 134, and the battery 222 can be the same as or very similar to those used for receptacle 100. The display control switches 106 can be capacitive and located with the PCB electronics 134, and be capacitively coupled to the balloon 1100 such that touching the balloon 1100 would activate the switches 106. Alternatively, the switches 106 could be located in the balloon weight or clip 1101. The balloon weight or clip 1101 could also be in the same location as the PCB electronics 134 and/or the battery 222.

One design for the programming contacts 406 would be to have them extending out from the electronics/display package 116 located on the balloon 1100. In this application, the programming contacts 406 could be covered after programming with a section of the overlay 104, or a wire cover 1103 that contains protected adhesive that is applied after the removal of a film. Programming could also be accomplished via the RF or IR wireless communications 213 similar to that of the receptacle 100. An IR window can be made integral to the overlay 104 to allow for IR light transmission.

The PCB electronics 134 can be essentially the same as for the previous receptacle 100 examples, and can be programmed at all levels, from the factory, to the reseller, and to the end user. The balloon display 108 can be interactive with the user, and can also be preprogrammed for an image(s) and/or sound to be activated or changed at predetermined times. For example, the real time clock function in the microprocessor 218 could be programmed to activate the sound and visual displays to sing "Happy Birthday", and to sequence preprogrammed images on the display 108 at specific times corresponding to the birthday party itinerary. Later, the audio and/or visual displays could be programmed to change at specific time(s) of the day. In this mode, the display could automatically be changed by the microprocessor 218 at any pre-set times including multiple times within one day, less than once a day, or even less than once a week or once a month. The period of time between display changes can vary. For instance, the period of display change can begin once every 5 minutes for the first 6 hours, then once an hour for 2 days, then once a day for a week, and then once a week. Timing for when to begin changing the display and/or audio content can be set up to coincide with the beginning/ending of a party, etc.

Alternative Embodiment—Snow Globe Receptacle

FIGS. 11 through 13c illustrate a snow globe receptacle 1200 with a flat LCD display alternative to 108 and the PCB electronics 134 containing circuitry similar to the receptacle 100, including the microprocessor 218 with the real time clock function, the non-volatile memory 214, the power circuitry 222, 223, 224, and the accelerometer 215. Access to the battery 222, the programming contacts 406, and the display control switches 106 can be via a bottom cover 1207 in the snow globe base 1203, which can be made to be removable or partially removable. The wireless communications port 213 can be used to reprogram and provide another means to control the microprocessor 218 programs and the operation of the snow globe 1200.

The display 108 (see FIG. 11) can be configured to be a transmissive or transflective LCD display with a backlight integral to the display 108 that provides light for the display while illuminating the scenery inside the snow globe 1200. Activation, deactivation, and changes to the display 108 can be made through the display control switches 106 located in the base bottom cover 1207, or through the detection of movement or taps sensed via the accelerometer 215. User interaction with the snow globe 1200 can include directional movement (relative to the snow globe), tap sequence, and tap direction sensed via the accelerometer 215. The real time clock function provided by the microprocessor 218 can be used with the tap detection, timing between taps to decode dash/dot type sequences.

A microphone 231 (see FIG. 2) along with microphone amplifier circuitry 230 (see FIG. 2) and the A-to-D converter internal to the microprocessor 218 can be used to digitize personal messages, music, and/or other sounds. The results can be stored in the non-volatile memory 214, and subsequently accessed by the microprocessor 218 and played back and listened to using the speaker 229 and the D-to-A converter and amplifier circuitry 228. It is noted that PWM (Pulse Width Modulation) may be used in lieu of the D-to-A converter to create an analog signal for generating sounds while reducing costs. The display control switches 106 and/or the accelerometer 215 detected movements/taps can be used to control when sounds are recorded. Playback may be initiated by the user, or by programs executed by the microprocessor 218. Sounds may also be recorded on a smart phone and downloaded to the non-volatile memory 214 via the USB or other serial interface 212 located in the base 1203, or via the wireless communications port 213. Music and other sounds can also be in the snow globe 1200 initial programming, and can be played back in coordination with the display 108 images and special effects from optics 238 (see FIG. 2) and a pump/motor interface (I/F) 233 (see FIG. 2). User control of music selection can be via the display control switches 106 and/or by the microprocessor 218 programs.

Figure 11:
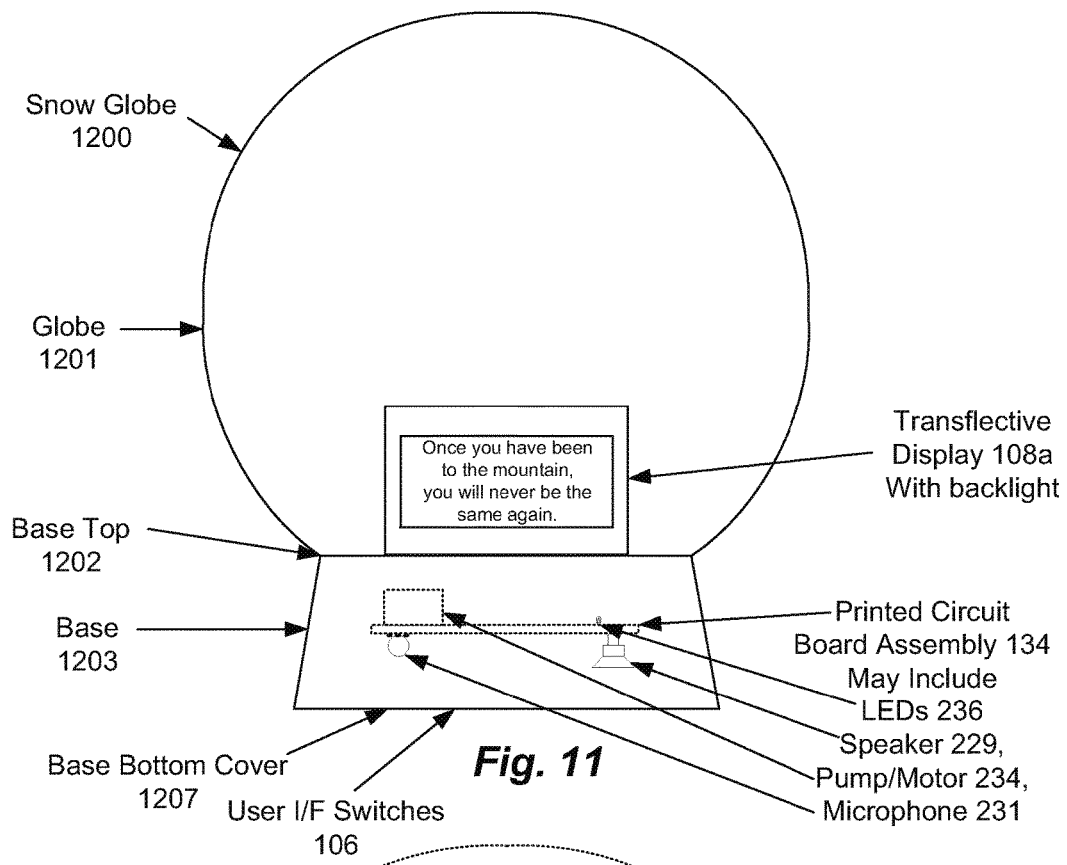
FIG. 11 is a front view of an alternative embodiment of the receptacle of FIG. 1a with the display mounted inside of a snow globe and electronics mounted inside the base.
Figure 12:
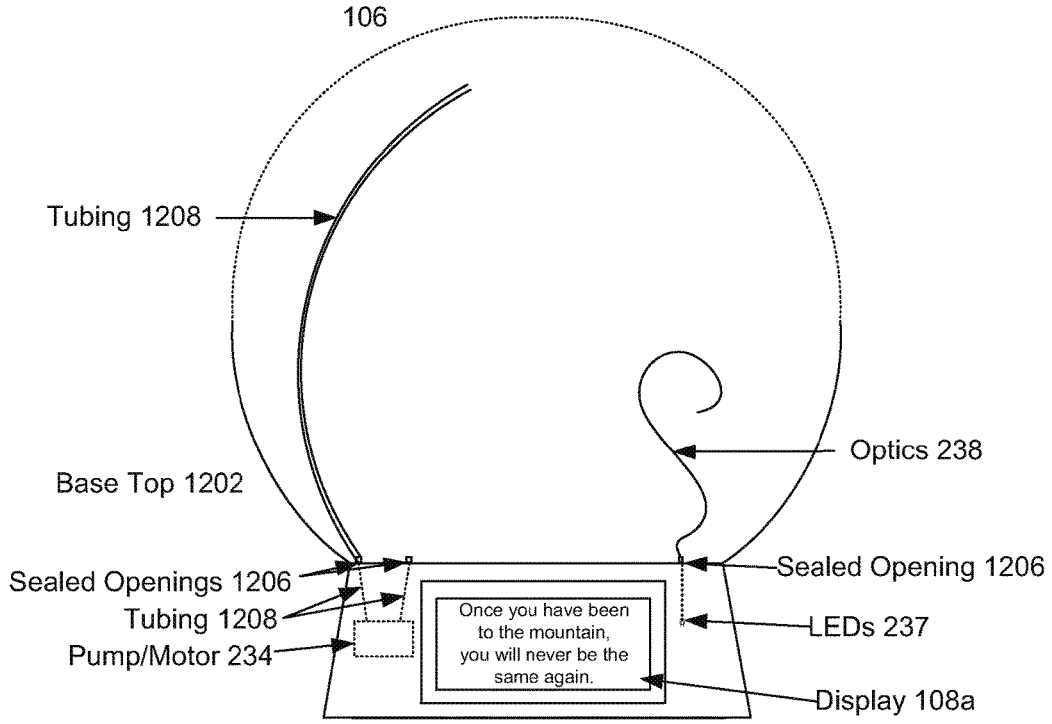
FIG. 12 is a front view of an alternative embodiment of the receptacle of FIG. 11, with the display mounted on the outside of the snow globe base, the electronics mounted inside the base, and optical fibers, tubing, and/or wires passing through the base top into the snow globe through sealed openings.

FIGS. 2, 11, and 12 show a pump or motor 234 that can be controlled by the microprocessor 218 via the pump/motor interface 233 to circulate the liquid in the globe 1201, providing movement of the "snow" within the globe 1201 without lifting, tilting, or shaking the snow globe 1200. Tubes or wires that are required to pass through the base top 1202 into the globe 1201 can be brought through via sealed openings 1206 in the base top 1202. In this way liquid can be circulated through the pump 234, or wires can be brought through to the motor 234, which can be used to move a paddle wheel or other movement device within the globe 1201. The display control switches 106 and/or user tap commands detected by the accelerometer 215 and recognized by the microprocessor 218 can be used to activate and deactivate the pump or motor 234 along with the timer(s) in the microprocessor 218. Programs run by the microprocessor 218 can also be used to activate, deactivate, and control (speeds, etc.) the pump/motor 234.

FIGS. 2, 11, and 12 further show LEDs 237 coupled to the optics 238 that are controlled by the microprocessor 218 via an LED interface 236, providing special lighting effects within the globe 1201. The optics 238 include optical fibers that can pass through the base top 1202 into the globe 1201 through the sealed openings 1206 in the base top 1202. In a similar way to controlling the motor/pump 234, the display control switches 106 and/or tap commands detected by the accelerometer 215, along with the microprocessor timer(s), can be used to detect when a user wants to activate or deactivate the LEDs 237 used with optics 238 for special lighting effects. The optics 238 could include optical fibers, light guides, light diffusers, reflectors, etc. Programs run by the microprocessor 218 can also be used to activate, deactivate, and control (LED on/off sequence, intensity, etc.) the LEDs 237.

FIG. 12 illustrates the display 108 mounted on the outside of the base 1203. It should be noted that a snow globe carrier can be designed that would contain all of the PCB electronics 134, the display 108, and the battery 222 located independently of the snow globe 1200, while providing for the display 108 images, sound recordings via the microphone 231, and/or sound via the speaker 229, similar to that of the snow globe of FIG. 12.

FIGS. 11, 13*a*, and 13*b* have the display 108 located inside the globe 1201. FIG. 13*b* illustrates a slot 1204 made of clear plastic and integral to the base top 1202 that provides a space for the display 108 to be located within the globe 1201, while keeping it protected from the liquid in the globe 1201. FIGS. 13*b*, 13*c* also illustrate optical window(s) 1205 in the base top 1202 that allow light from the optics 238, located in the base 1203, to pass through the base top 1202 and into the globe 1201. The optical window(s) 1205 can be any size and/or shape needed to complement the optics 238 in order to locate the light and light intensity in optimal directions, which may include providing lighting for the display 108 and/or any scenery within the globe 1201. The LCD display 108 (see FIGS. 13*a*, 13*b*) can be transparent (no backlight or reflector), and therefore images can be viewed from both sides. In this way, the snow globe 1200 can contain two separate scenes, one in each half of the snow globe 1200. Examples of this include day/night, summer/winter, quotes from two different writers or politicians, etc. The user can also control image orientation on the display 108. When the snow globe 1200 is tilted away from the user, the display image orientation can be toward the user.

Having described the above illustrative embodiments, further modifications and/or variations of the presently disclosed receptacles can be made. For example, abnormal temperature conditions can be time-stamped with date and time, and logged into the non-volatile memory 214 for later recall in the event the receptacle is sent back to the factory. Such abnormal temperature conditions may include a very hot condition for an extended period of time (may indicate use in a dishwasher that is prohibited by the manufacturer), or a temperature that exceeds the rating of the receptacle.

In addition, the flexible display 108 may provide the receptacle temperature in all or part of the display. The display 108 may also include the time and/or date in all or part of the display. The different stages of user consumption from the receptacle, e.g., full, ¾, ½, ¼, empty, can also be monitored, and, in conjunction with these various stages of consumption, a different part of a story, lesson, or any other suitable presentation that can be presented with a beginning and an end, a beginning, a middle, and an end, etc., can be displayed on the display 108 during the various consumption stages.

In addition, alternate power sources in the display/electronics package 116 can include a flat battery such as the Solicore Flexion flat lithium battery. This would work particularly well with the receptacle configured as the balloon 1100.

An alternative implementation of the flexible display 108 can also include flexible glass. Such a glass display can have its own protective coating, and may not require the use of a plastic overlay. The user inputs may be capacitive touch built into the display, either on the imaging portion of the display or on a portion of the display that extends below the imaging portion. There could also be individual touch locations (replacing some or all of the switches).

A further alternative embodiment can include a touch screen over the display area. In one application, the flexible glass display 108 can be extended to the base 102 of the receptacle 100 such that the flex cable(s) 210, 211 would pass at a right angle into the base 102. An indentation can be designed into the receptacle 100 so that when the glass display 108 is mounted onto the receptacle 100, the display surface is contiguous with the surface of the receptacle 100. The flexible glass can be epoxied directly to the receptacle 100 and around the edges of the display 108, and/or the electronics 134 can be installed behind the flexible display 108.

For packaging with the electronics 134 disposed behind the display 108, the electronics 134 can be potted to the back of the display 108 in such a way that it would sealingly fit the receptacle surface. With such packaging, the potted electronics 134 can be epoxied to the receptacle 100, and the perimeter of the flexible glass display can be sealingly fixed to the receptacle 100.

The programming/reprogramming of the receptacle via the programming contacts 406 can also be accessed through a hole that can later be plugged, epoxied, or otherwise sealed after completion.

The globe 1201 or the display 108 in the snow globe 1200 configuration of the receptacle can have a touch screen for the display control switches 106 to control lighting, motors, display, sound, etc. An AC-to-AC or AC-to-DC converter that plugs into a wall outlet or a USB cable can provide power. If the battery (or batteries) 222 or super cap(s) are used, then they can be rechargeable. Recharging power can also be provided by, energy harvesting, including RF, NFC, piezoelectric, solar and thermal, inductive, magnetic resonance or other form of wireless charging for any embodiments of the receptacle, 100, 900, 1100.

It will further be appreciated by those of ordinary skill in the art that further modifications to and variations of the above-described programmable, interactive display receptacle with independent activation and change may be made without departing from the inventive concepts disclosed herein. Accordingly, the invention should not be viewed as limited except as by the scope and spirit of the appended claims.

What is claimed is:

1. A receptacle, comprising:
   a receptacle surface;
   a visual display affixed to the receptacle surface;
   activation components including a sensor operative to sense one or more of receptacle use and receptacle status, a user input operative to sense a user input selection, and a real time clock operative to time stamp one or more of (1) the sensed receptacle use, (2) the sensed receptacle status, and (3) the sensed user input selection;

at least one memory operative to record data representing one or more of (1) the sensed receptacle use, the sensed receptacle status, and the sensed user input selection, and (2) the time stamped receptacle use, the time stamped receptacle status, and the time stamped user input selection;

at least one processor operative to execute at least one program out of the at least one memory:

to analyze any combination of the data representing the sensed receptacle use, the sensed receptacle status, the sensed user input selection, the time stamped receptacle use, the time stamped receptacle status, and the time stamped user input selection; and to control at least the visual display for displaying the at least one display image based on the analyzed data; and at least one image or form disposed on at least a part of the receptacle having a connection to at least one visual display image of the receptacle.

2. The receptacle of claim 1 further including an audio component operative to produce audible sound.

3. The receptacle of claim 1 further including an audio component operative to record sound.

4. The receptacle of claim 3 wherein the at least one memory is further operative to store data representing a plurality of audible sounds.

5. The receptacle of claim 4 wherein the processor is further operative, in response to the activation components, to control the audio component for broadcasting the data representing the plurality of audible sounds from the at least one memory.

6. The receptacle of claim 1 further comprising:
first memory programmed for timing of at least one of events in a day, week, month or year, or events within a day, week, month, or year; and
second memory having visual display data with associated events, and
wherein the processor is further operative to execute the at least one program out of the at least one memory responsive to the timing of the events in the first memory to control the visual display for displaying event display images.

7. The receptacle of claim 1 further comprising:
first memory programmed for timing of at least one of events in a day, week, month or year, or events within a day, week, month, year; and
second memory having an audible sound, or plurality of audible sound data associated with associated events, and
wherein the processor is further operative to execute at least one program out of the at least one memory in response to the timing of the events in the first memory to control an audio component for broadcasting data from the second memory.

8. The receptacle of claim 1 wherein the real time clock is further operative to time stamp selective receptacle use and status for storage in the at least one memory for use in finding receptacle use patterns, predicting or anticipating future use, or documenting misuse.

9. The receptacle of claim 1 further including a temperature sensor operative to sense temperature in proximity to the visual display, wherein the at least one memory is further operative to store data for displaying control requirements over a temperature range, and wherein the processor is further operative to execute the at least one program out of the at least one memory responsive to temperature sensor and display control requirements over temperature range data to control the visual display including compensating refresh time or voltage levels, and for activating, not activating, deactivating, changing, or not changing the display.

10. The receptacle of claim 1 further including a temperature sensor operative to sense temperature in the receptacle, and wherein the at least one memory is further operative to store display data corresponding to temperature sensor data, and wherein the processor is further operative to execute the at least one program out of the at least one memory responsive to the activation components, the temperature sensor data, and the display data in the at least one memory corresponding to temperature sensor data, and to update the visual display with the receptacle temperature.

11. The receptacle of claim 1 wherein the user input includes capacitive or resistive touch switches, pressure sensors, proximity sensors, optical sensors, acoustic sensors including microphones, RF communications including NFC (Near Field Communications) and Bluetooth, or accelerometers sensing specific receptacle orientations, movements, receptacle tapping locations and tapping codes.

12. The receptacle of claim 1 wherein the user input is operative to control display activation, deactivation, change or to keep fixed, select or program audio, text, graphic or video content and to interact with games and other programs.

13. The receptacle of claim 1 wherein the sensor includes an accelerometer for monitoring receptacle angle, velocity, orientation, tilt, or tap.

14. The receptacle of claim 1 wherein the at least one memory is further operative to store a time stamped history of at least one of the receptacle use, the receptacle status, the user input, integrated receptacle status, and integrated receptacle use, and wherein the processor is further operative to execute the at least one program out of the at least one memory to analyze the time stamped history to detect patterns, to predict future use, and to display at least one image on the visual display based on the analysis.

15. The receptacle of claim 1 further including a wired or wireless communications to an external host, the external host being operative to receive the data representing one or more of the sensed receptacle use, the sensed receptacle status, and the sensed user input selection and data representing integrated receptacle status and integrated receptacle use with or without a time stamp from the at least one memory, allowing the external host to analyze the sensed receptacle use data, the sensed user input selection data, the integrated receptacle status data, and the integrated receptacle use data.

16. The receptacle of claim 15 wherein the external host is further operative to transmit, to the receptacle, selected video data to be displayed on the visual display based on external host analysis of the received data.

17. The receptacle of claim 1 wherein the at least one processor is further operative to execute the at least one program out of the at least one memory to analyze the recorded data to detect different modes of use including hand washing of the receptacle, the receptacle moving at a high speed, the receptacle being washed in a dish washer, storing analysis data in the at least one memory, and controlling the visual display to activate, to deactivate, to change, or to stay fixed in response to a mode of receptacle operation.

* * * * *